(12) United States Patent
Hyoudou et al.

(10) Patent No.: US 9,602,438 B2
(45) Date of Patent: Mar. 21, 2017

(54) RELAY APPARATUS AND CONTROL METHOD THEREOF

(71) Applicant: FUJITSU LIMITED, Kawasaki-shi, Kanagawa (JP)

(72) Inventors: Kazuki Hyoudou, Chofu (JP); Yukihiro Nakagawa, Kawasaki (JP); Takeshi Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 170 days.

(21) Appl. No.: 14/067,100

(22) Filed: Oct. 30, 2013

(65) Prior Publication Data

US 2014/0169379 A1 Jun. 19, 2014

(30) Foreign Application Priority Data

Dec. 17, 2012 (JP) ................................. 2012-274418

(51) Int. Cl.
*H04L 12/931* (2013.01)
*H04L 12/64* (2006.01)
*H04L 12/721* (2013.01)

(52) U.S. Cl.
CPC ........ *H04L 49/354* (2013.01); *H04L 12/6418* (2013.01); *H04L 49/351* (2013.01); *H04L 45/26* (2013.01)

(58) Field of Classification Search
None
See application file for complete search history.

(56) References Cited

U.S. PATENT DOCUMENTS

| 7,562,390 B1* | 7/2009 | Kwan ................. H04L 63/0236 726/23 |
| 2009/0249472 A1* | 10/2009 | Litvin et al. .................... 726/14 |
| 2010/0165877 A1 | 7/2010 | Shukla et al. |
| 2011/0035494 A1 | 2/2011 | Pandey et al. |
| 2011/0085563 A1 | 4/2011 | Kotha et al. |
| 2011/0238820 A1 | 9/2011 | Matsuoka |
| 2012/0008528 A1* | 1/2012 | Dunbar ................. H04L 12/462 370/255 |
| 2012/0063363 A1* | 3/2012 | Li et al. ........................ 370/255 |
| 2013/0058346 A1* | 3/2013 | Sridharan et al. ............ 370/392 |

FOREIGN PATENT DOCUMENTS

JP 2011-198299 10/2011

* cited by examiner

*Primary Examiner* — Khaled Kassim
*Assistant Examiner* — Zhaohui Yang
(74) *Attorney, Agent, or Firm* — Oblon, McClelland, Maier & Neustadt, L.L.P.

(57) ABSTRACT

A disclosed relay apparatus includes: a generator that generates, upon receipt of a first packet that includes a first identifier of a virtual machine that is newly executed in an information processing apparatus connected to the relay apparatus from the information processing apparatus, a second packet that includes a second identifier of the virtual machine, which is different from the first identifier, and requests to set relay for the virtual machine; and a processing unit that sets the relay for the virtual machine by using the second identifier of the virtual machine, which is included in the second packet generated by the generator or received from the information processing apparatus.

13 Claims, 19 Drawing Sheets

| MAC ADDRESS | VLANID | PORT IDENTIFIER |
|---|---|---|
| MAC50 | VLAN 1 | P1 |
| MAC60 | VLAN 2 | P2 |
| ⋮ | ⋮ | ⋮ |

| VSIID | PROFILE DATA |
|---|---|
| VSIID OF VM1 | PROFILE DATA 1 |
| VSIID OF VM2 | PROFILE DATA 2 |
| VSIID OF VM3 | PROFILE DATA 3 |
| ⋮ | ⋮ |

| DESTINATION MAC ADDRESS (01:80:C2:00:00:0E) | SOURCE MAC ADDRESS | ETHER TYPE (0x88B7) | VDP TLV (TLV: Type, Length, Value) |

| TLV TYPE | VALUE |
|---|---|
| Pre-Associate | 0x01 |
| Pre-Associate with resource reservation | 0x02 |
| Associate | 0x03 |
| De-associate | 0x04 |
| VSI manager ID | 0x05 |
| Organizationally defined TLV | 0x7F |
| Reserved for future standardization | 0x00 0x06-0x7E |

| No | LEARNING STATE OF MAC ADDRESS | RECEIVING PORT | GENERATION OF VDP (TEMPORARY RECEIVING PORT) | TRANSMISSION TO UPLINK |
|---|---|---|---|---|
| (1) | NOT LEARNED | DOWNLINK | ASSOC (RECEIVING PORT) | YES |
| (2) | | UPLINK | - | - |
| (3) | | PORT Dn | - | - |
| (4) | LEARNED AT DOWNLINK (PORT Dn) | DOWNLINK OTHER THAN Dn | ASSOC (RECEIVING PORT) DE-ASSOC (PORT Dn) | NO |
| (5) | | UPLINK | DE-ASSOC (PORT Dn) | YES |
| | | UPLINK (IN CASE OF MULTI-PATH) | | |
| (6) | LEARNED AT UPLINK (PORT Um) | DOWNLINK | ASSOC (RECEIVING PORT) | YES |
| (7) | | PORT Um | - | - |
| (8) | | UPLINK OTHER THAN Um (IN CASE OF MULTI-PATH) | ASSOC (RECEIVING PORT) DE-ASSOC (PORT Um) | NO |

FIG.11

| No | LEARNING STATE OF MAC ADDRESS | RECEIVING PORT OF PACKET | GENERATION OF VDP (TEMPORARY RECEIVING PORT) |
|---|---|---|---|
| (9) | NOT LEARNED | DOWNLINK | ASSOC (RECEIVING PORT) |
| (10) | LEARNED AT DOWNLINK (PORT Dn) | PORT Dn | – |
| (11) | | DOWNLINK OTHER THAN Dn | ASSOC (RECEIVING PORT) DE-ASSOC (PORT Dn) |

RELAY APPARATUS AND CONTROL METHOD THEREOF

CROSS-REFERENCE TO RELATED APPLICATIONS

This application is based upon and claims the benefit of priority of the prior Japanese Patent Application No. 2012-274418, filed on Dec. 17, 2012, the entire contents of which are incorporated herein by reference.

FIELD

This invention relates to a relay apparatus and control method of the relay apparatus.

BACKGROUND

Movement or the like of a virtual machine (for example, movement (or migration) of, creation of and elimination (or deletion) of a virtual machine) is performed by server virtualization without depending on the arrangement of physical servers. After the movement or the like of the virtual machine has been performed, it is not possible for the virtual machine that moved to perform communication unless resettings of the physical switches in the network are performed.

Problems in communication in the case where a virtual machine has moved by live migration will be explained using FIG. 1. In the system illustrated in FIG. 1, a physical server 1 is connected to port P1 of a physical switch, and a physical server 2 is connected to port P2 of the physical switch. A Virtual Local Area Network (VLAN) α and a VLAN β are set for the port P1 of the physical switch. In the state before a virtual machine VM1 moves, the VMs 1 to n are executed on a hypervisor in the physical server 1, and VM are not executed in the physical server 2. It is presumed that the VM1 belongs to the VLAN α.

Here, it is presumed that the VM1 moves by the live migration from the physical server 1 to the physical server 2. The VM1 transmits packets in the physical server 2, which is the destination of the movement, in order to perform communication with the VM in the physical server 1. The port P2 of the physical switch receives the packets that were transmitted from the VM1. However, the setting for the VLAN α has not been performed for the port P2, so the physical switch is not able to relay the packets received from the VM1.

There is a technique that automatically performs setting of the physical switch when the movement or the like of the virtual machine has been performed. More specifically, when the physical switch receives a packet from a virtual machine after the movement, the physical switch identifies a profile from a profile DataBase (DB) based on the transmission source ID (for example, MAC address) that is included in the received packet. The physical switch then applies the identified profile to the port that received the packet.

However, this technique does not anticipate that the physical switch will be connected in a multi-stage connection (also called a cascade connection). Moreover, the specifications of apparatuses differ for each vendor, so compatibility among apparatuses is difficult. Therefore, it is difficult to apply this technique to a network in which the physical switches are connected with the multi-stage connection.

Moreover, in Virtual station interface Discovery and configuration Protocol (VDP) that is regulated in IEEE 802.1Qbg, when the movement or the like of the virtual machine is performed, the physical switch is automatically set. More specifically, when the movement or the like of the virtual machine is performed, the hypervisor in the physical server transmits a VDP packet to the physical switch. The physical switch identifies a profile from a Virtual Station Interface (VSI) manager based on a VSI ID that is included in a data field of the VDP packet. The physical switch then applies the identified profile to the port after the movement, according to the type of VDP packet, or deletes the identified profile from the port before the movement.

However, in this technique, there is a problem in that the hypervisor of the physical server cannot be used unless the hypervisor supports the VDP.

In other words, there is no technique for automatically setting the physical switch even if the hypervisor in the physical server does not support the VDP.

SUMMARY

A relay apparatus relating to this invention, includes: (A) a generator that generates, upon receipt of a first packet that includes a first identifier of a virtual machine that is newly executed in an information processing apparatus connected to the relay apparatus from the information processing apparatus, a second packet that includes a second identifier of the virtual machine, which is different from the first identifier, and requests to set relay for the virtual machine; and (B) a processing unit that sets the relay for the virtual machine by using the second identifier of the virtual machine, which is included in the second packet generated by the generator or received from the information processing apparatus.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 11 is a diagram depicting generation conditions of the VDP packet;

DESCRIPTION OF EMBODIMENTS

With the method explained below, it is possible to automatically set a physical switch regardless of whether or not the physical switch is connected with the multi-stage connection. In the following, the explanation will be divided into the case in which the physical switch is connected with the multi-stage connection, and the case in which the physical switch is not connected with the multi-stage connection.

Embodiment 1

Figure 1:
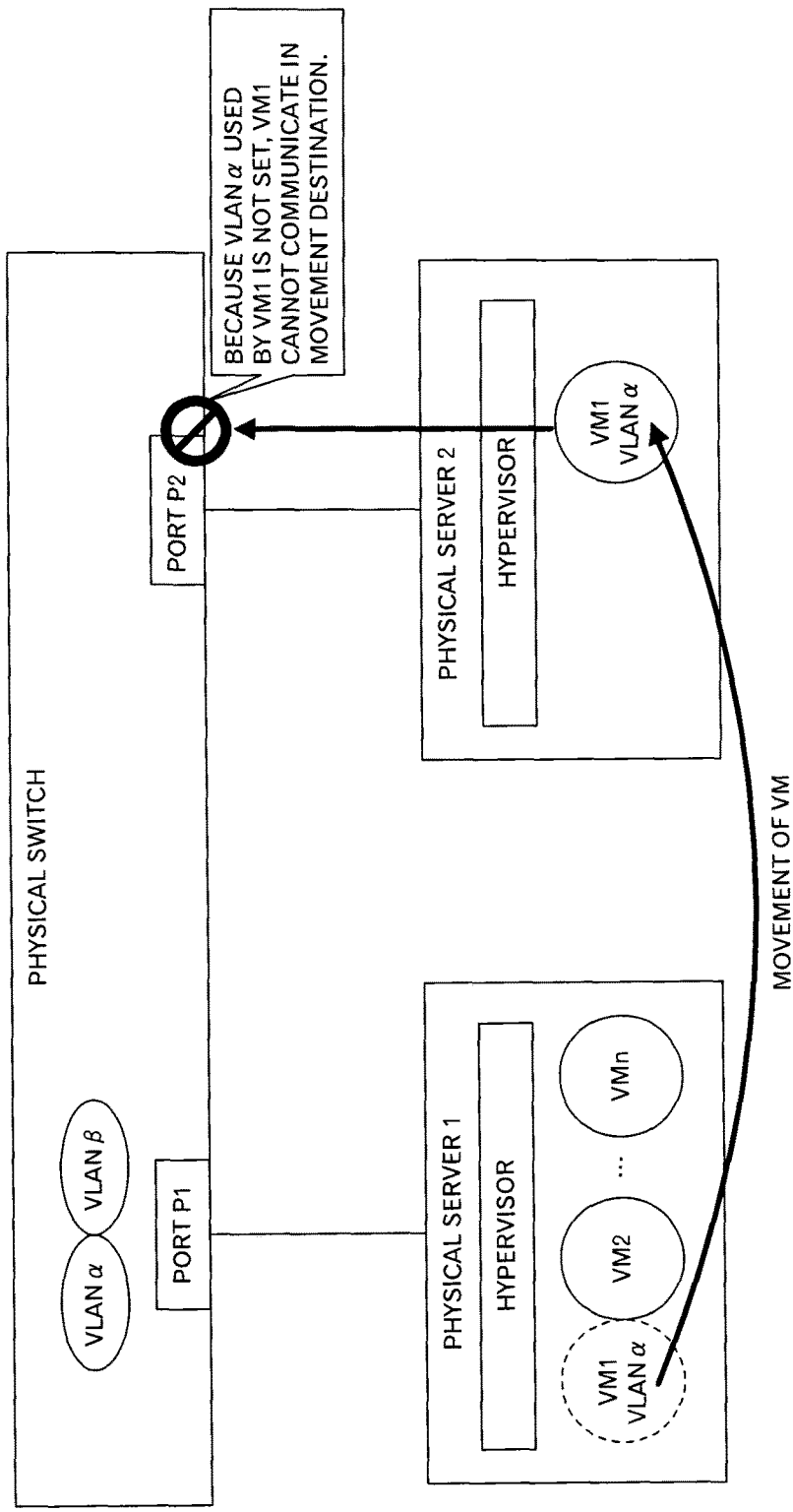
FIG. 1 is a diagram depicting movement of a virtual machine by live migration.
Figures 2, 4, 5:
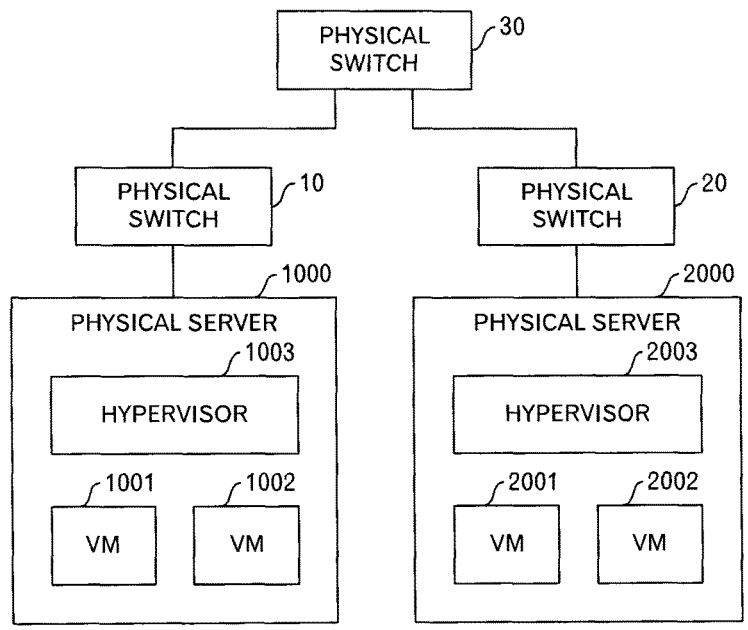
FIG. 2 is a diagram depicting an outline of a system relating to a first embodiment.
FIG. 4 is a diagram depicting an example of data stored in a Forwarding DataBase.
FIG. 5 is a diagram depicting an example of data stored in a profile database.

In a first embodiment, the case in which the physical switch is connected by the multi-stage connection will be explained. FIG. 2 illustrates a system of this first embodiment. The system of this first embodiment includes physical servers 1000 and 2000 and physical switches 10 to 30. The physical switches 10 to 30 are connected by the multi-stage connection, where the physical switches 10 and 20 are placed under the physical switch 30. The physical server 1000 is connected to the physical switch 10, and the physical server 2000 is connected to the physical switch 20. Each physical switch is connected to a management server 50 that manages a profile DB 51, however, to make the system easier to understand, the management server 50 has been omitted in the figure.

The physical switch 30 conforms to the IEEE 802.1Qbg standard. The physical switches 10 and 20 conform to the IEEE 802.1Qbg standard, and are capable of executing the method (hereafter, called the Address Resolution Protocol (ARP)-VDP method) explained in the embodiment below. Hypervisors 1003 and 2003 do not have to conform to the IEEE 802.1Qbg standard.

The physical server 1000 executes the hypervisor 1003, which is a program for executing virtual machines in the physical server 1000. Virtual machines VM 1001 and 1002 are executed on the hypervisor 1003. Similar to the physical server 1000, the physical server 2000 executes the hypervisor 2003. Moreover, virtual machines VM 2001 and 2002 are executed on the hypervisor 2003.

Figure 3:
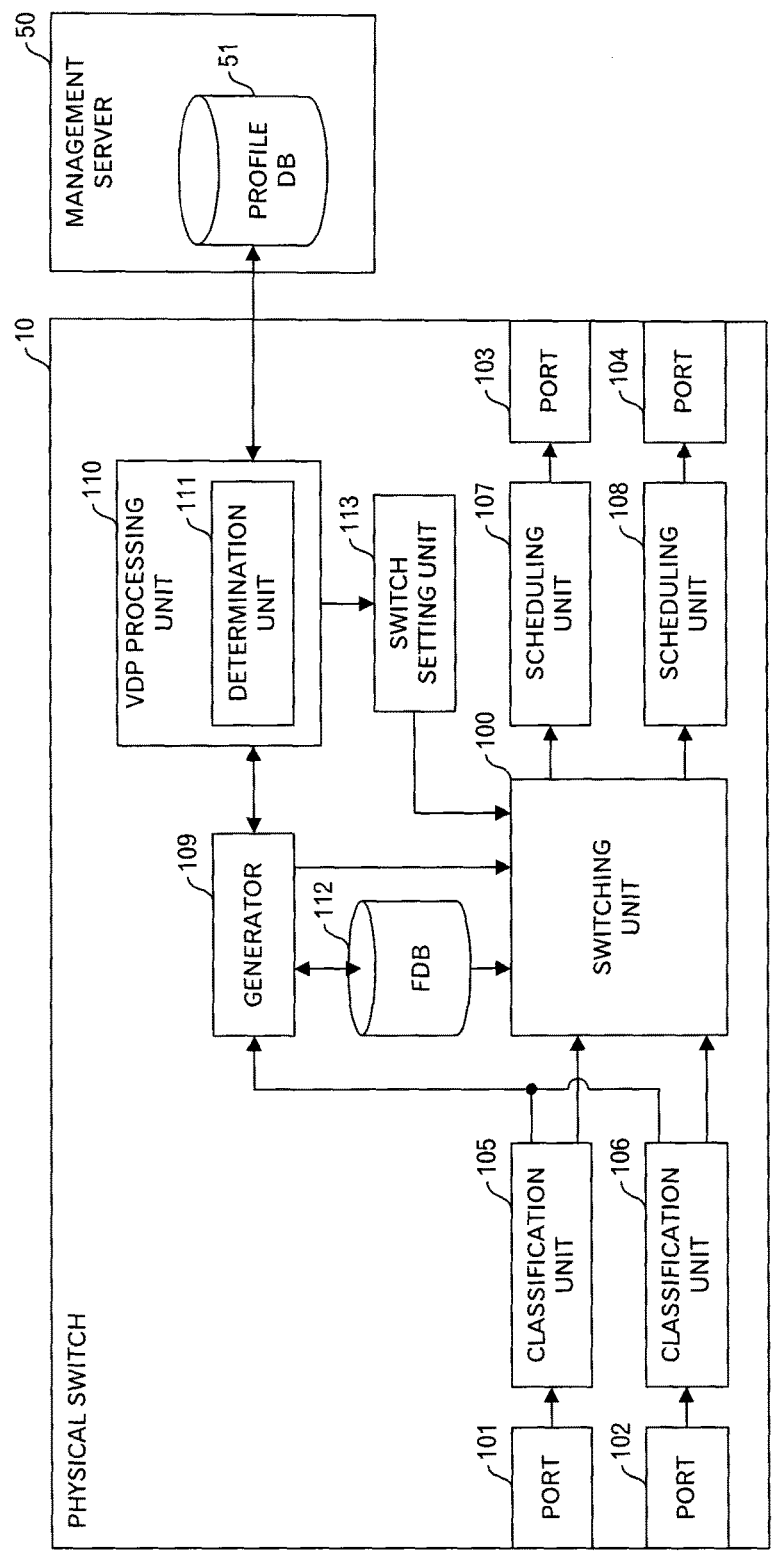
FIG. 3 is a functional block diagram of a physical switch and a management server.

FIG. 3 illustrates functional blocks of the physical switch 10 and functional blocks of the management server 50 that is connected to the physical switch 10. The physical switch 10 includes a switching unit 100, ports 101 to 104, classification units 105 and 106, scheduling units 107 and 108, a generator 109, a VDP processing unit 110, a determination unit 111, a Forwarding DataBase (FDB) 112, and a switch setting unit 113. The block diagram of the functional blocks of the physical switch 20 is the same as the block diagram of the functional blocks of the physical switch 10.

The port 101 outputs received packets to the classification unit 105. Similarly, the port 102 outputs received packets to the classification unit 106.

When the protocol of the packet is VDP, ARP, Gratuitous Address Resolution Protocol (GARP), Reverse Address Resolution Protocol (RARP) or Cisco Discovery Protocol (CDP), the classification unit 105 outputs the packet to the generator 109. When the protocol is the other protocol, the classification unit 105 outputs the packet to the switching unit 100. Similarly, when the protocol of the packet is VDP, ARP, GARP, RARP or CDP, the classification unit 106 outputs the packet to the generator 109. When the protocol is the other protocol, the classification unit 106 outputs the packet to the switching unit 100.

When the protocol of a packet received from the classification unit 105 is a protocol other than VDP, the generator 109 uses data that is stored in the FDB 112 to generate a VDP packet, and outputs the generated VDP packet to the VDP processing unit 110. When the protocol of a packet received from the classification unit 105 is VDP, the generator 109 outputs the VDP packet to the VDP processing unit 110.

The VDP processing unit 110 uses the VDP packet that was received from the generator 109 to execute a VDP processing. More specifically, the VDP processing unit 110 executes a processing to acquire profile data that corresponds to the VSIID, which is VM ID information that is included in the VDP Packet, from a profile DB 51 of the management server 50. The VPD processing unit 110 then outputs the acquired profile data and information about the receiving port to the switch setting unit 113.

The switch setting unit 113 changes attribute values (for example, VLAN information and QoS (Quality of Service) information of the port, which is held by the switching unit 100, based on the data received from the VDP processing unit 110.

The determination unit 111 determines whether or not a VDP packet is to be transmitted to the physical switch 30, which is a physical switch in a higher level than the physical switch 10. When the VDP packet is to be transmitted, the determination unit 111 outputs the VDP packet to the generator 109. After receiving the VDP packet from the determination unit 111, the generator 109 outputs that VDP packet to the switching unit 100. The generator 109 also outputs a packet such as an ARP packet or the like to the switching unit 100.

The switching unit 100 outputs a packet to the scheduling unit 107 or scheduling unit 108 based on the attribute value of each port, which is held by the switching unit 100, and the data that is stored in the FDB 112.

The scheduling unit 107 executes a processing for setting the schedule for transmitting the packets, and outputs the packet to be transmitted to the port 103. Similarly, the scheduling unit 108 executes a processing for setting the schedule for transmitting the packets, and outputs the packet to be transmitted to the port 104. The ports 103 and 104 transmit the received packet to the destination apparatus.

FIG. 4 illustrates an example of data that is stored in the FDB 112. In the example in FIG. 4, the MAC address, VLANID and port identifier of virtual machines are stored. The port identifier, for example, is the port number or port bit map.

The management server 50 manages the profile DB 51 that stores profile data.

FIG. 5 illustrates an example of data that is stored in the profile DB 51. In the example in FIG. 5, VSIID, which is information for identifying a VM, and profile data are stored. Information such as VLAN information and QoS information is included in the profile data.

Next, the operation of the system in a first embodiment will be explained using FIG. 6 to FIG. 21. First, the processing that is executed when the physical switch 10 receives an ARP packet will be explained using FIG. 6 to FIG. 14. Here, an example in which an ARP packet is used will be explained, however, the packet may also be a GARP, RARP or CDP packet.

The port 101 in the physical switch 10 receives an ARP packet from the physical server 1000 or physical switch 30 (FIG. 6: step S1), and outputs that ARP packet to the classification unit 105.

The packet that was received from the port 101 is an ARP packet, so the classification unit 105 outputs the ARP packet to the generator 109.

The generator 109 receives the ARP packet from the classification unit 105, and generates a VDP packet according to generation conditions (step S3), and outputs that VDP packet to the VDP processing unit 110.

Figures 7, 8, 9:
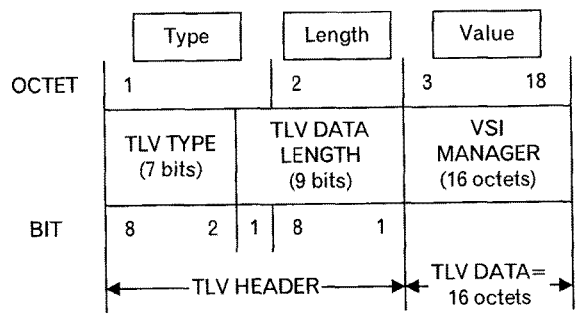
FIG. 7 is a diagram depicting an example of a VDP packet.
FIG. 8 is a diagram depicting a value to be set in a field of "Type" in VDPTLV.
FIG. 9 is a diagram depicting an example of VDPTLV.

FIG. 7 illustrates an example of a VDP packet when the protocol is VDP version 2.0, and the protocol of the data link layer is Ethernet (registered trademark). In the example in FIG. 7, the VDP packet includes a field for the destination MAC address, a field for the transmission source MAC address, a field for the EtherType, and a field for data that is expressed in TLV (Type, Length, Value) format (VDPTLV). The address 01:80:C2:00:00:0E is set for the destination MAC address, and 0x88B7 is set for the EtherType. Plural VDPTLV may be included.

FIG. 8 illustrates values that are set in a field for the "Type" in VDPTLV. In FIG. 8, seven TLV types are illustrated, and different values are assigned for each TLV type.

FIG. 9 illustrates an example of VDPTLV. The example in FIG. 9 is VDPTLV that specifies a VSI manager. The field that corresponds to the TLV header includes a field for the "Type" and a field for the "Value". The field that corresponds to the TLV data includes a field for the "Value". The 7-bit value (0x00) that is illustrated in FIG. 8 is set in the field for the "Type". A 9-bit TLV information length is set in the field for the "Length". 16-octet information that represents the VSI manager is set in the field for the "Value".

Figure 10:
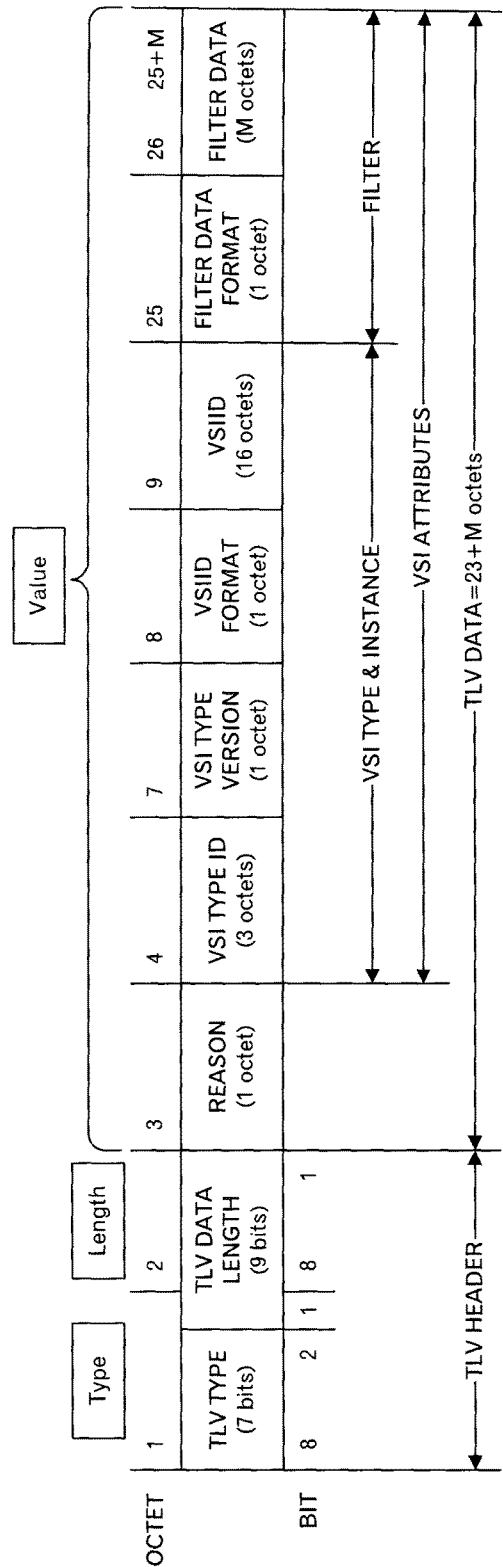
FIG. 10 is a diagram depicting an example of VDPTLV.

FIG. 10 illustrates another example of VDPTLV. The example in FIG. 10 is VDPTLV that represents PRE-ASSOCIATE, ASSOCIATE (hereafter, abbreviated as ASSOC), DE-ASSOCIATE (hereafter, abbreviated as DE-ASSOC), and the like. The field that corresponds to the TLV header includes a field for "Type" and a field for "Length". The field that corresponds to the TLV data includes a field for "Value". The 7-bit values (0x01, 0x03 and 0x04) that are illustrated in FIG. 8 are set in the field for the "Type". A 9-bit TLV information length is set in the field for "Length". (23+M (M is the length of filter data))-octet information is set in the field for the "Value".

FIG. 11 illustrates generation conditions for the VDP packet at the step S3. In FIG. 11, in the column for the "MAC address learning state", the learning state for the MAC address (MAC address in this embodiment) that is included in the ARP packet is given. If learning of the MAC address has been performed, a port identifier that corresponds to the MAC address is already registered in the FDB 112. A downlink is a port on the physical server side, and an uplink is a port on the network side (in the example in FIG. 2, the physical switch 30 side). In FIG. 11, the downlink for which learning of the MAC address was performed is taken to be Dn, and the uplink for which learning of the MAC address was performed is taken to be Um.

In the column for "receiving port", the port that received the ARP packet is given. Multi-path represents the existence of plural communication paths between physical servers.

In the column for "VDP generation", the type of the VDP packet that the generator 109 generates is given, and "temporary receiving port" is given in parentheses. The temporary receiving port is a port that is regarded as having received the VDP packet (is not absolutely the port that actually received the VDP packet). The physical switch 10 performs setting as having received the VDP packet from the temporary receiving port.

In the column for "Transmission to uplink", whether or not a VDP packet is to be transmitted to the physical switch that is connected to the uplink (physical switch 30 in the example in FIG. 2) is represented. Whether or not transmission to the uplink is to be performed is determined by the determination unit 111.

Figure 12:
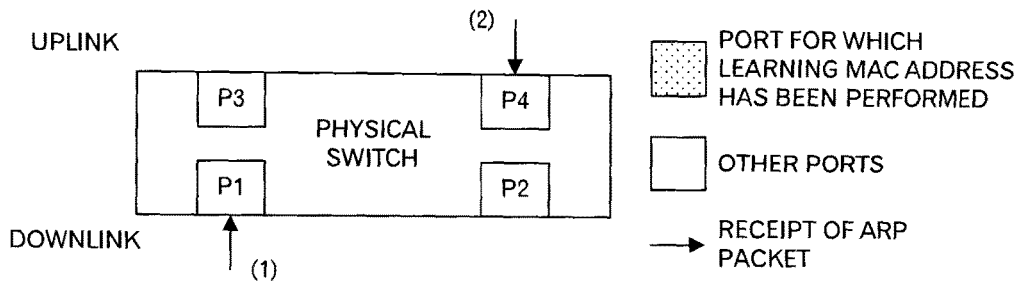
FIG. 12 is a diagram to explain the generation conditions in the first embodiment.
Figure 13:
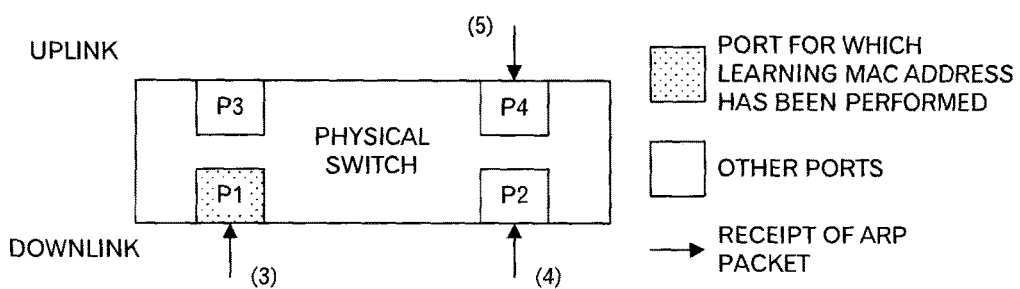
FIG. 13 is a diagram to explain the generation conditions in the first embodiment.
Figure 14:
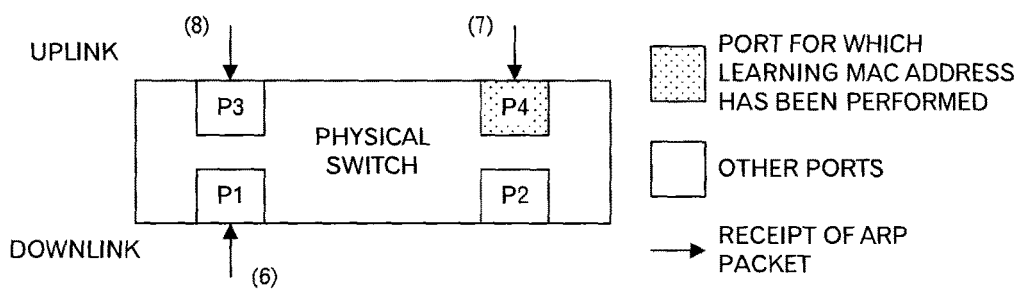
FIG. 14 is a diagram to explain the generation conditions in the first embodiment.

The generation conditions will be explained in detail using a simple example that is illustrated in FIG. 12 to FIG. 14. In FIG. 12 to FIG. 14, a physical switch has ports P1 to P4, where the ports P1 and P2 are downlinks and the ports P3 and P4 are uplinks. A shaded port is a port for which learning of the MAC address has been performed. In other words, the port is a port that is registered in the FDB 112 as being a port that corresponds to the MAC address that is included in the ARP packet. The arrow represents receiving of the ARP packet.

In the generation conditions illustrated in FIG. 11, condition (1) corresponds to (1) in FIG. 12. More specifically, when an ARP packet has been received from downlink (P1), the entry of the MAC address that is included in that ARP packet is not registered in the FDB 112. In such a case, it is considered that a new VM has been executed in the physical server that is connected to P1, so a VDP packet that is an ASSOC type of VDP packet is generated. The setting in the physical switch that is connected to the uplink is also changed, so the VDP packet is transmitted to the physical switch that is connected to the uplink.

In the generation conditions illustrated in FIG. 11, condition (2) corresponds to (2) in FIG. 12. More specifically, when an ARP packet is received from the uplink (P4), an entry of the MAC address that is included in that ARP packet is not registered in the FDB 112. In such a case, the setting in the physical switch does not need to be changed, so a VDP packet is not generated.

In the generation conditions illustrated in FIG. 11, condition (3) corresponds to (3) in FIG. 13. More specifically, when an ARP packet is received from port Dn (P1) the MAC address that is included in that ARP packet is registered in the FDB 112 in correlation with the identifier of the port Dn.

In such a case, the setting in the physical switch does not need to be changed, so a VDP packet is not generated.

In the generation conditions illustrated in FIG. 11, condition (4) corresponds to (4) in FIG. 13. More specifically, when an ARP packet was received from a downlink (P2) other than the port Dn, the MAC address that is included in the ARP packet is registered in the FDB 112 in correlation with the identifier of the port Dn. In such a case, it is considered that the VM has moved from the physical server that is connected to P1 to the physical server that is connected to P2. Therefore, an ASSOC type of VDP packet is generated for P2, and a DE-ASSOC type of VDP packet is generated for P1. However, the VM moved between physical servers that are connected to the same physical switch, so the setting in the physical switch that is connected to the uplink does not need to be changed. Therefore, a VDP packet is not transmitted to the physical switch that is connected to the uplink.

In the generation conditions illustrated in FIG. 11, condition (5) corresponds to (5) in FIG. 13. More specifically, when an ARP packet has been received from the uplink (P4), the MAC address that is included in that ARP packet is registered in the FDB 112 in correlation with the identifier of the port Dn. In such a case, it is considered that the VM has moved from the physical server that is connected to P1 to the physical server that is connected to a port of another physical switch, so a DE-ASSOC type of VDP packet is generated for P1. Then, in order to also change the setting in the physical switch that is connected to the uplink, the VDP packet is transmitted to the physical switch that is connected to the uplink.

In the generation conditions illustrated in FIG. 11, condition (6) corresponds to (6) in FIG. 14. More specifically, when an ARP packet is received from the downlink (P1), the MAC address that is included in that ARP packet is registered in the FDB 112 in correlation with the identifier of port Um. In such a case, it is considered that a virtual machine executed on the physical server that is connected to a port of another physical switch has moved to the physical server that is connected to P1, so an ASSOC type of VDP packet is generated for P1. Then, in order to also change the setting in the physical switch that is connected to the uplink, the VDP packet is transmitted to the physical switch that is connected to the uplink.

In the generation conditions illustrated in FIG. 11, condition (7) corresponds to (7) in FIG. 14. More specifically, when an ARP packet has been received from the port Um (P4), the MAC address that is included in that ARP packet is registered in the FDB 112 in correlation with the identifier of the port Um. In such a case, the setting in the physical switch does not need to be changed, so a VDP packet is not generated.

In the generation conditions illustrated in FIG. 11, condition (8) corresponds to (8) in FIG. 14. This example is an example in the case of the multi-path. More specifically, when an ARP packet has been received from the uplink (P3), the MAC address that is included in that ARP packet is registered in the FDB 112 in correlation with the identifier of the port Um. In that case, it is considered that the VM moves from a physical server that uses the path via P4 to a physical server that uses the path via P3. Therefore, an ASSOC type of VDP packet is generated for P3, and a DE-ASSOC type of VDP packet is generated for P4. However, the setting in the physical switch that is connected to the uplink does not have to be changed, so a VDP packet is not transmitted to the physical switch that is connected to the uplink.

Figure 6:
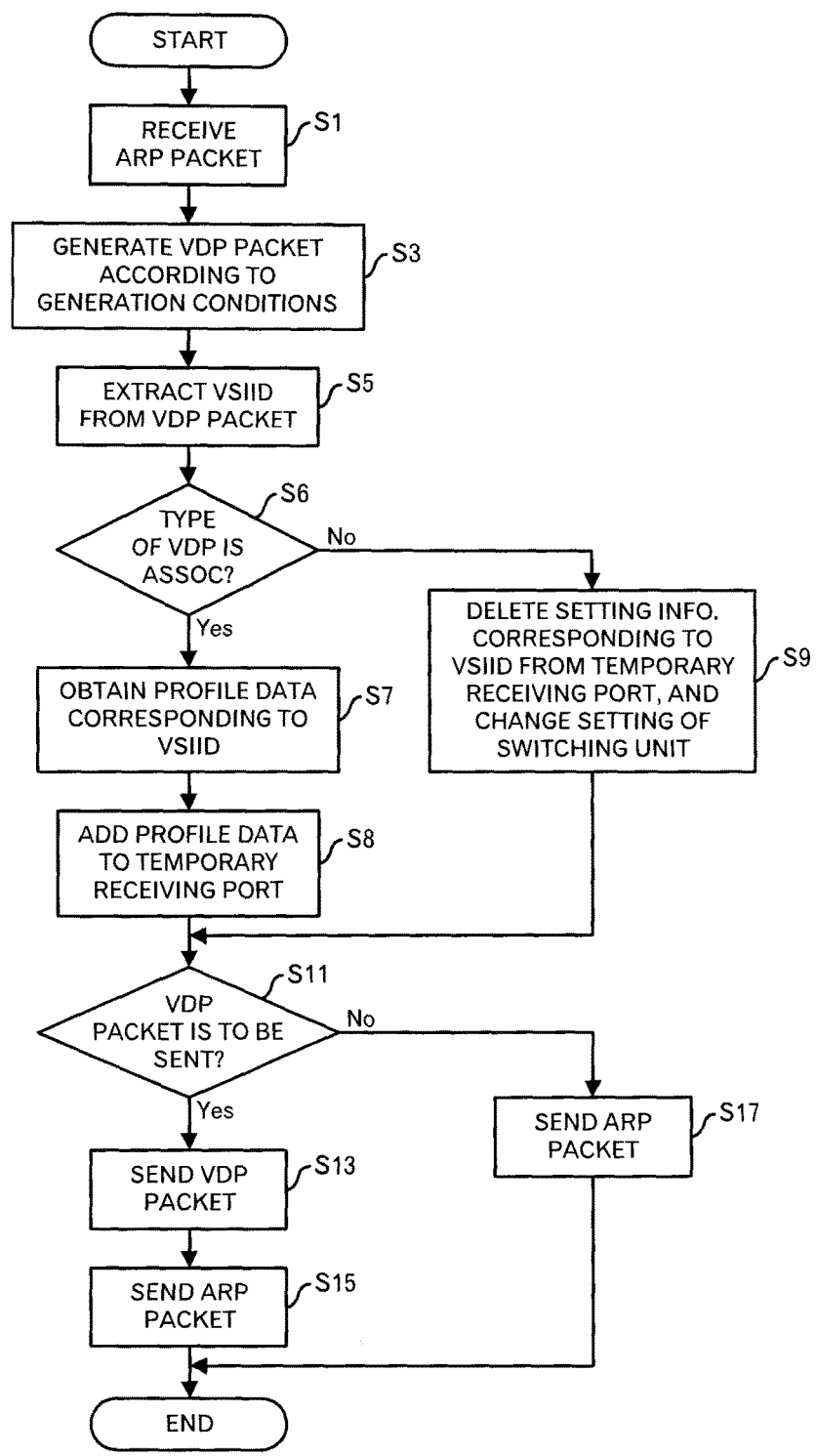
FIG. 6 is a diagram depicting a processing flow of a processing executed by the physical switch in case of receipt of an Address Resolution Protocol packet.

Returning to the explanation of FIG. 6, the VDP processing unit 110 that received the VDP packet from the generator 109 extracts the VSIID, which is identification information for the virtual machine, from the VDP packet (step S5).

The VDP processing unit 110 determines whether or not the type of the VDP packet is ASSOC (step S6). When the type of the VDP packet is ASSOC (step S6: YES route), the VDP processing unit 110 acquires the profile data that corresponds to the VSIID from the profile DB 51 in the management server 50 (step S7). The VDP processing unit 110 outputs the acquired profile data and information about the receiving port to the switch setting unit 113. The VDP processing unit 110 acquires information about the receiving port from the classification unit 105, for example.

The switch setting unit 113 changes the setting of the switching unit 100 by adding the profile data to the temporary receiving port (step S8). By the processing at the step S8, communication can be performed with no problem even after the movement has been performed.

On the other hand, when the type of the VDP packet is not ASSOC (step S6: NO route), the type of the VDP packet is DE_ASSOC, so the VDP processing unit 110 notifies the switch setting unit 113 of that. The switch setting unit 113 changes the setting of the switching unit 100 according to notification from the VDP processing unit 110 by eliminating the setting information corresponding to VSIID from the temporary receiving port (step S9).

The determination unit 111 of the VDP processing unit 110 determines whether or not a VDP packet is to be transmitted to the physical switch (here, this is physical switch 30) that is connected to the uplink (step S11). As a premise, the physical switch 10 registers the ID (for example, VSIID) of the VM whose profile data is applied to the port in the physical switch 10 in a determination data storage unit. When the type of the VDP packet is ASSOC, the determination at the step S11 is performed according to whether or not the ID that is included in the VDP packet is registered in the determination data storage unit. When the ID is registered, it is presumed that the VM has communicated from the beginning through the physical switch 10. Therefore, the setting in the physical switch that is connected to the uplink does not need to be changed, and a VDP packet is not transmitted. When the ID is not registered, the VM newly performs communication via the physical switch 10. Therefore because, the setting in the physical switch that is connected to the uplink is changed, a VDP packet is transmitted.

When a VDP packet will be transmitted to the physical switch 30 (step S11: YES route), the VDP processing unit 110 outputs the VDP packet to the generator 109. The generator 109 outputs the VDP packet that was received from the VDP processing unit 110 to the switching unit 100, and outputs an ARP packet to the switching unit 100. In response to this, the switching unit 100 outputs the VDP packet to a scheduling unit (here, this is the scheduling unit 107) that performs scheduling for the port to which the physical switch 30 is connected. At the timing for transmitting the VDP packet, the scheduling unit 107 outputs the VDP packet to the port 103. The port 103 then transmits the VDP packet to the physical switch 30 (step S13).

The switching unit 100 outputs the ARP packet to a scheduling unit so that the ARP packet arrives at a physical server that executes a virtual machine that belongs to the same VLAN as that of the virtual machine that is the transmission source. At the timing for transmitting the ARP packet, the scheduling unit that received the ARP packet outputs the ARP packet to a port. The port that received the ARP packet transmits the APR packet (step S15). This transmission corresponds to a broadcast to the VMs that belong to the same VLAN as that of the VM that is the transmission source.

On the other hand, when a VDP packet will not be transmitted to the physical switch 30 (step S11: NO route), the VDP processing unit 110 notifies the generator 109 that the VDP packet will not be transmitted. The generator 109 then outputs the ARP packet to the switching unit 100. In response to this, the switching unit 100 outputs the ARP packet to a scheduling unit so that the ARP packet arrives at a physical server that executes a virtual machine that belongs to the same VLAN as that of the virtual machine that is the transmission source. At the timing for transmitting the ARP packet, the scheduling unit that received the ARP packet outputs the ARP packet to a port. The port that received the ARP packet transmits the ARP packet (step S17).

By executing the processing described above, even when the hypervisor in the physical server does not support VDP, it is possible to generate a VDP packet in the physical switch, so it is possible to automatically set the physical switch that is connected with the multi-stage connection. Moreover, by adding the generator 109 and determination unit 111 to a conventional physical switch, it is possible to achieve the processing described above, so the conventional technique can be effectively used by only making small changes to the physical switch. In other words, according to the ARP-VDP method, it is possible to greatly increase the range of automatic setting even with small changes to the conventional technique.

Moreover, in this first embodiment, after the generated VDP packet has been transmitted, a packet such as an ARP packet is transmitted. As a result, new settings are reflected on the physical switches in a system first, so packets such as ARP packets are not discarded.

Figure 15:
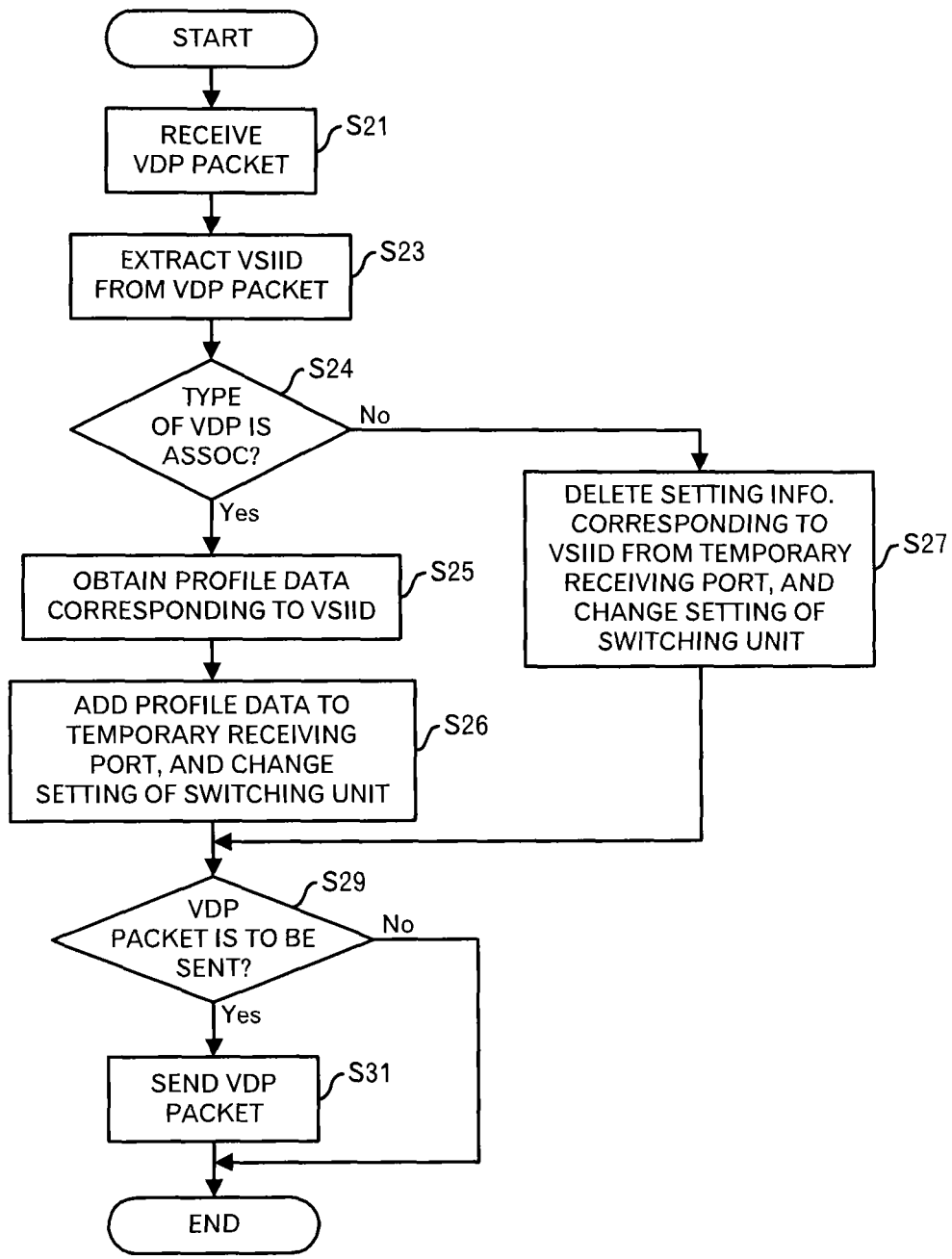
FIG. 15 is a diagram depicting a processing flow of a processing executed by the physical switch in case of receipt of the VDP packet.

Next, a processing that is executed when the physical switch 10 receives a VDP packet will be explained using FIG. 15.

The port 101 in the physical switch 10 receives a VDP packet from the physical server 1000 that conforms to the IEEE 802.1Qbg standard (FIG. 15: step S21), and outputs that packet to the classification unit 105. The packet received from the port 101 is a VDP packet, so the classification unit 105 outputs the packet to the generator 109. When the generator 109 receives the VDP packet from the classification unit 105, the generator 109 outputs the packet to the VDP processing unit 110.

The VDP processing unit 110 that received the VDP packet from the generator 109 extracts the VSIID, which is identification information for the VM, from the VDP packet (step S23).

The VDP processing unit 110 determines whether or not the type of the VDP packet is ASSOC (step S24). When the type of the VDP packet is ASSOC (step S24: YES route), the VDP processing unit 110 acquires profile data that corresponds to the VSIID from the profile DB 51 in the management server 50 (step S25). The VDP processing unit 110 then outputs the acquired profile data and information about the receiving port to the switch setting unit 113. The VDP processing unit 110 acquires information about the receiving port from the classification unit 105, for example.

The switch setting unit 113 adds the profile data to a temporary receiving port, and changes the setting of the setting unit 100 (step S26). As a result of the processing at the step S26, communication can be performed with no problem after the movement or the like of the VM is performed.

On the other hand, when the type of the VDP packet is not ASSOC (step S24: NO route), the type of the VDP packet is DE-ASSOC, so the VDP processing unit 110 notifies the switch setting unit 113 of that. In response to notification from the VDP processing unit 110, the switch setting unit 113 deletes the setting information that corresponds to the VSIID from the temporary receiving port, and changes the setting of the switching unit 100 (step S27).

The determination unit 111 of the VDP processing unit 110 determines whether or not a VDP packet is to be transmitted to a physical switch (here, this is physical switch 30) that is connected to the uplink (step S29). As a premise, it is presumed that the physical switch 10 registers the ID (for example, VSIID) of the VM whose profile data is applied to the port inside the physical switch 10 in a determination data storage unit (not illustrated in the figure). Then, when the type of the VDP packet is ASSOC, the determination at the step S29 is performed according to whether or not the ID that is included in the VDP packet is registered in the determination data storage unit. When the ID has been registered, the VM has communicated by way of the physical switch 10 from the beginning. Therefore, the setting in the physical switch that is connected to the uplink does not need to be changed, and a VDP packet is not transmitted. When the ID is not registered, the VM is newly performing communication by way of the physical switch 10. Therefore, in order to change the setting in the physical switch that is connected to the uplink, a VDP packet is transmitted.

When a VDP packet is transmitted to the physical switch 30 (step S29: YES route), the VDP processing unit 110 outputs the VDP packet to the generator 109. The generator 109 then outputs the VDP packet that was received from the VDP processing unit 110 to the switching unit 100. In response to this, the switching unit 100 outputs the VDP packet to a scheduling unit (here, this is taken to be scheduling unit 107) that will perform scheduling for the port that is connected to the physical switch 30. At the timing for transmitting the VDP packet, the scheduling unit 107 outputs the VDP packet to the port 103. The port 103 then transmits the VDP packet to the physical switch 30 (step S31). On the other hand, when a VDP packet is not to be transmitted to the physical switch 30 (step S29: NO route), the processing ends.

By executing the processing such as described above, even when the hypervisor in the physical server supports VDP, and the VDP packet is received from the physical server, it becomes possible to automatically perform setting to the physical switches that are connected by the multi-stage connection.

Figure 16:
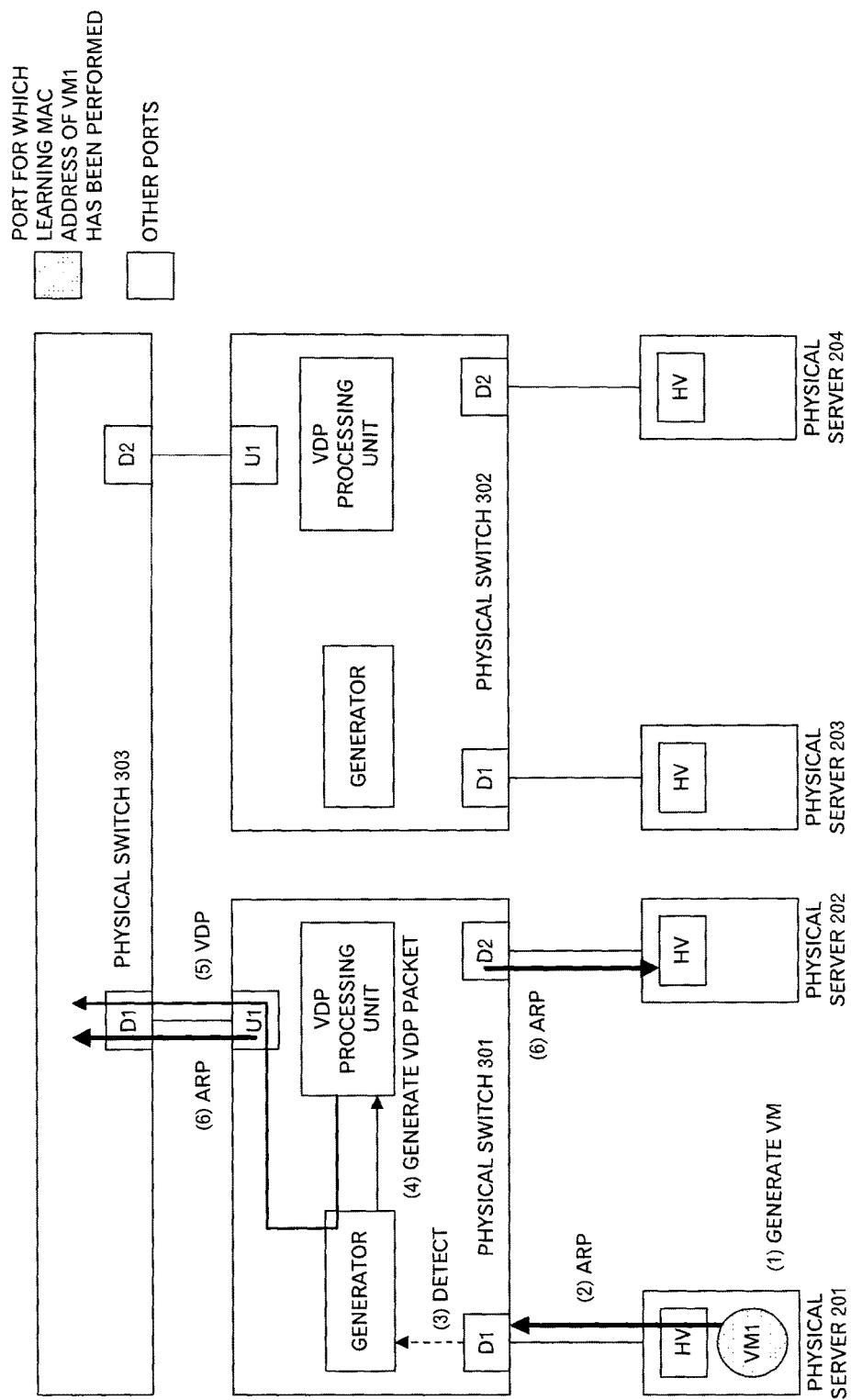
FIG. 16 is a diagram to explain relay of the VDP packet and ARP packet in the first embodiment.
Figure 17:
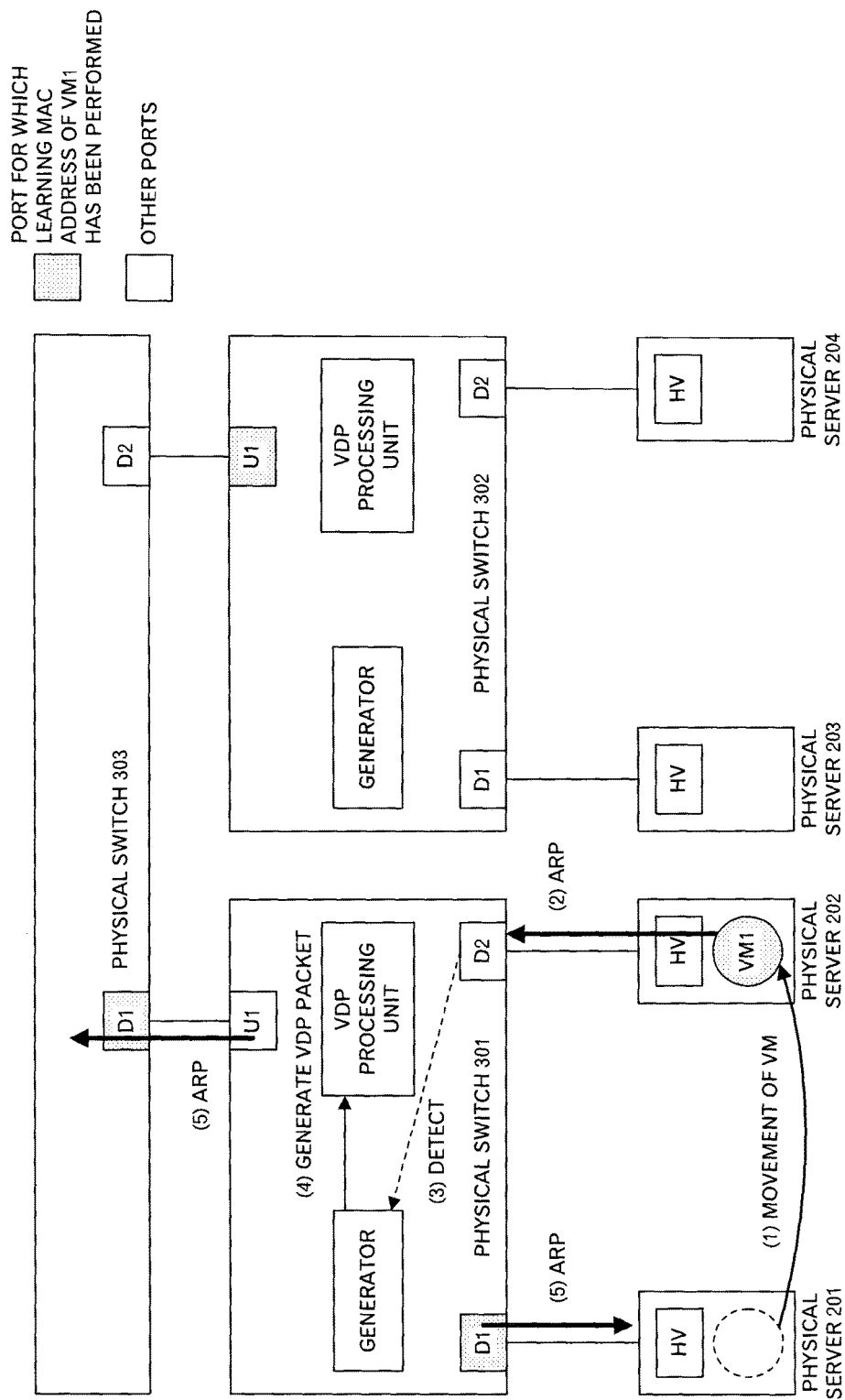
FIG. 17 is a diagram to explain relay of the VDP packet and ARP packet in the first embodiment.
Figure 18:
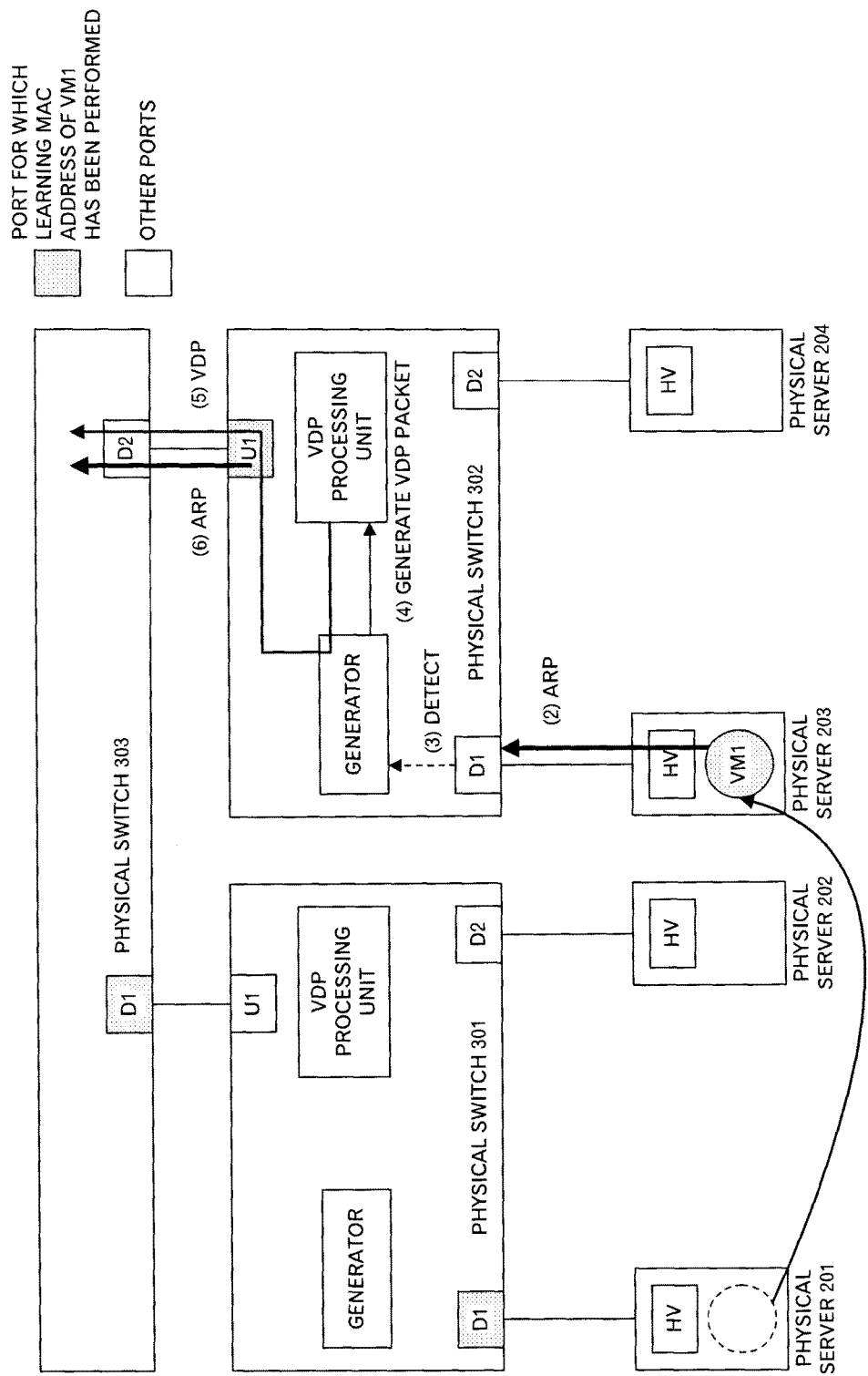
FIG. 18 is a diagram to explain relay of the VDP packet and ARP packet in the first embodiment.
Figure 19:
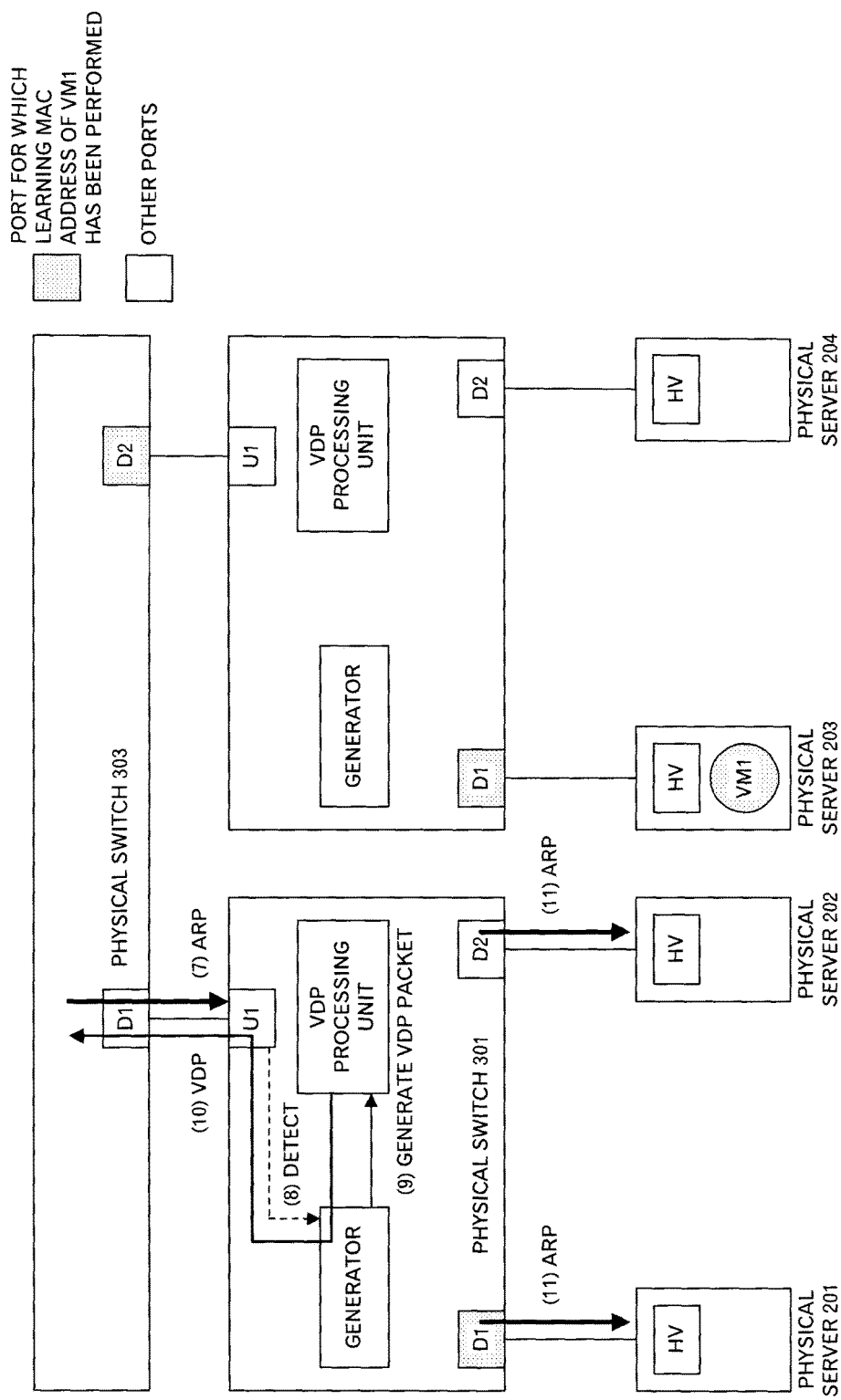
FIG. 19 is a diagram to explain relay of the VDP packet and ARP packet in the first embodiment.
Figure 20:
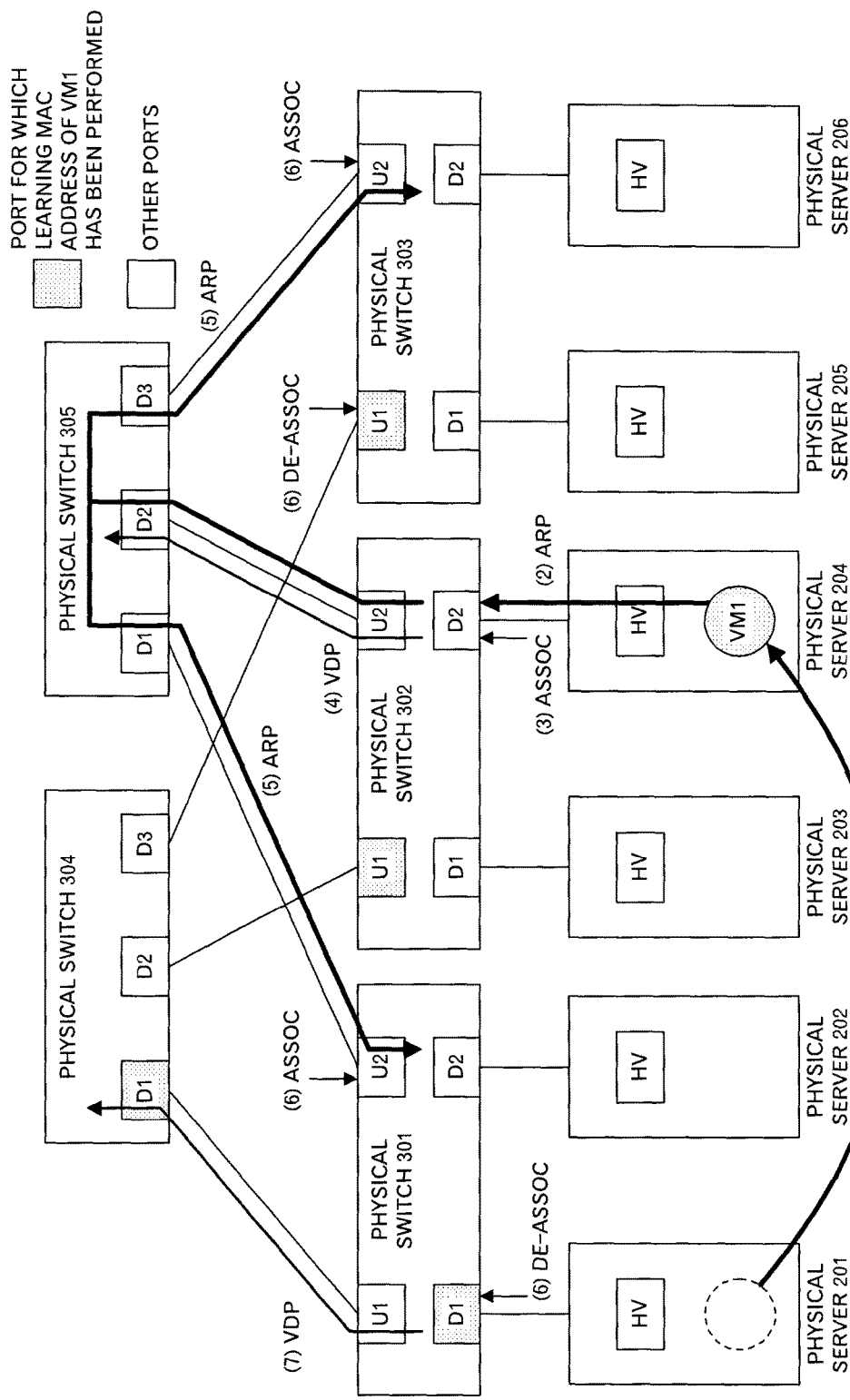
FIG. 20 is a diagram to explain relay of the VDP packet and ARP packet in the first embodiment.

Next, the relay of VDP packets and ARP packets in this first embodiment will be explained in detail using FIG. 16 to FIG. 20. FIG. 16 is an example of the case in which VM generation is performed. FIG. 17 is an example of the case in which a VM moved between physical servers that are connected to the same physical switch. FIG. 18 and FIG. 19 is an example of the case in which a VM moves between physical servers that are connected to different physical switches. FIG. 20 is an example of the case in which, in the multi-path system, a VM moves between physical servers that are connected to different physical switches.

The system illustrated in FIG. 16 to FIG. 19 has physical switches 301 to 303, and physical servers 201 to 204. The physical switches 301 and 302 are physical switches that can execute the ARP-VDP method, and the physical switch 303 is a physical switch that cannot execute the ARP-VDP method, however, conforms to the IEEE 802.1Qbg standard. The hypervisors in the physical servers 201 to 204 do not conform to the IEEE 802.1Qbg standard. HV is the abbreviation for hypervisor. The thick solid lines represent relays of ARP packets, and the thin solid lines represent relays of VDP packets. A dotted line represents the detection of an ARP packet.

The physical switches 301 to 303 are connected with the multi-stage connection. Port U1 of the physical switch 301 is connected to port D1 of the physical switch 303, and port U1 of the physical switch 302 is connected to port D2 of the physical switch 303. The physical server 201 is connected to port D1 of the physical switch 301, and the physical server 202 is connected to port D2 of the physical switch 301. The physical server 203 is connected to port D1 of the physical switch 302, and the physical server 204 is connected to port D2 of the physical switch 302.

In FIG. 16, at the stage where learning the MAC address of VM1 is not performed, VM1 is newly generated in the physical server 201 ((1) in FIG. 16). The generated VM1 transmits an ARP packet to the physical switch 301 ((2) in FIG. 16). The physical switch 301 detects the ARP packet from VM1 at the port D1 ((3) in FIG. 16). The generator regards this as an ASSOC type of VDP packet being received from the port D1, which is a temporary receiving port, and generates a VDP packet ((4) in FIG. 16). The VDP processing unit receives the VDP packet and executes the VDP processing. The physical switch 301 relays the VDP packet to the physical switch 303 ((5) is FIG. 16), then, after that, the physical switch 301 broadcasts an ARP packet to the physical switch 303 and the physical server 202 that belong to the same domain ((6) in FIG. 16). As a result, it is possible to appropriately set the relay of packets for VM1 in the physical switch 303.

In FIG. 17, learning the MAC address of VM1 has been performed for the port D1 of the physical switch 301, the port U1 of the physical switch 302 and the port D1 of physical switch 303. At this stage, VM1 moves from the physical server 201 to the physical server 202 ((1) in FIG. 17). After moving, VM1 transmits an ARP packet to the physical switch 301 ((2) in FIG. 17). The physical switch 301 detects the ARP packet from VM1 at the port D2 ((3) in FIG. 17). The generator regards this as being that an ASSOC type of VDP packet has been received from the port D2, which is a temporary receiving port, and that a DE-ASSOC type of VDP packet has been received from the port D1, which is a temporary receiving port, and generates a VDP packet ((4) in FIG. 17). The VDP processing unit receives the VDP packet and executes the VDP processing. Without relaying the VDP packet, the physical switch 301 broadcasts an ARP packet to the physical switch 303 and the physical server 201 that belong to the same domain ((5) in FIG. 17).

In FIG. 18, learning the MAC address of VM1 has been performed for the port D1 of the physical switch 301, the port U1 of the physical switch 302 and the port D1 of the physical switch 303. At this stage, VM1 has moved from the physical server 201 to the physical server 203 ((1) in FIG. 18). After moving, VM1 transmits an ARP packet to the physical switch 302 ((2) in FIG. 18). The physical switch 302 detects the ARP packet from VM1 at the port D1 ((3) in FIG. 18). The generator regards this as being that an ASSOC type of VDP packet was received from the port D1, which is a temporary receiving port, and generates a VDP packet ((4) in FIG. 18). The VDP processing unit receives the VDP packet and executes the VDP processing. The physical switch 302 relays the VDP packet to the physical switch 303 ((5) in FIG. 18), and after that, the physical switch 302 broadcasts an ARP packet to the physical switch 303 that belongs to the same domain ((6) in FIG. 18).

Moving to an explanation of FIG. 19, the physical switch 303 uses the VDP packet received from the physical switch 302 to execute the VDP processing. Moreover, the physical switch 303 transmits an ARP packet to the physical switch 301 ((7) in FIG. 19). The physical switch 301 detects the ARP packet from the physical switch 303 at the port U1 ((8) in FIG. 19). The generator regards this as being that a DE-ASSOC type of VDP packet was received from the port D1, which is a temporary receiving port, and generates a VDP packet ((9) in FIG. 19). The VDP processing unit receives the VDP packet and executes the VDP processing. The physical switch 301 relays the VDP packet to the physical switch 303 ((10) in FIG. 19), then after that, the physical switch 301 broadcasts an ARP packet to the physical servers 201 and 202 that belong to the same domain ((11) in FIG. 19). As a result, it is possible to adequately set the relay of packets for VM1 in the physical switch 303. Moreover, in the physical switch 302, the port at which learning the MAC address of VM1 is performed is changed to the port D1, and in the physical switch 303, the port at which learning the MAC address of VM1 is performed is changed to the port D2.

The system illustrated in FIG. 20 has physical switches 301 to 305, and physical servers 201 to 206. The physical switches 301 to 303 are physical switches that can execute the ARP-VDP method, and the physical switches 304 and 305 are physical switches that cannot execute the ARP-VDP method, however, conform to the IEEE 802.1Qbg standard. The hypervisors in the physical servers 201 to 206 do not conform to the IEEE 802.1Qbg standard. HV is the abbreviation for hypervisor. The thick solid lines represent a relay of an ARP packet, and the thin solid lines represent a relay of a VDP packet.

The physical switches 301 to 305 are connected with the multi-stage connection. Port U1 of the physical switch 301 is connected to port D1 of the physical switch 304, port U1 of the physical switch 302 is connected to port D2 of the physical switch 304, and port U1 of the physical switch 303 is connected to port D3 of the physical switch 304. Port U2 of the physical switch 301 is connected to port D1 of the physical switch 305, port U2 of the physical switch 302 is connected to port D2 of the physical switch 305, and port U2 of the physical switch 303 is connected to port D3 of the physical switch 305. The physical server 201 is connected to the port D1 of the physical switch 301, and the physical server 202 is connected to the port D2 of the physical switch 301. The physical server 203 is connected to the port D1 of the physical switch 302, and the physical server 204 is connected to the port D2 of the physical switch 302. The physical server 205 is connected to the port D1 of the physical switch 303, and the physical server 206 is connected to the port D2 of the physical switch 303.

In FIG. 20, learning the MAC address of VM1 is performed for the port D1 of the physical switch 301, the port U1 of the physical switch 302, the port U1 of the physical switch 303 and the port D1 of the physical switch 304. At this stage, VM1 moves from the physical server 201 to the physical server 204 ((1) in FIG. 20). After the movement, VM1 transmits an ARP packet to the physical switch 302 ((2) in FIG. 20). The physical switch 302 regards this as being that an ASSOC type of VDP packet has been received from the port D2, which is a temporary receiving port, and performs setting ((3) in FIG. 20). The physical switch 302 relays the VDP packet to the physical switch 305 ((4) in FIG. 20), and after that, the physical switch 302 broadcasts an ARP packet to the physical switch 305 that belongs to the same domain ((5) in FIG. 20).

The physical switch 305 transmits the received ARP packet to the physical switches 301 and 303 that belong to the same domain ((5) in FIG. 20). The physical switch 303 regards this as being that an ASSOC type of VDP packet was received from the port U2, which is a temporary receiving port, and that a DE-ASSOC type of VDP packet was received from the port U1, which is a temporary receiving port, and performs setting ((6) in FIG. 20). The physical switch 301 regards this as being that an ASSOC type of VDP packet was received from the port U2, which is a temporary receiving port, and that a DE-ASSOC type of VDP packet was received from the port D1, which is a temporary receiving port, and performs setting ((6) in FIG. 20). The physical switch 301 relays the VDP packet to the physical switch 304 ((7) in FIG. 20).

In this way, in the case of the multi-path system, it becomes necessary to change the settings for not only the downlink but also the uplink as well. The physical switch 302 may acquire the relay destination of the VDP packet and ARP packet from the profile data that was prepared in advance, or may determine the relay destination by giving linking information to the downlink and uplink.

Figure 21:
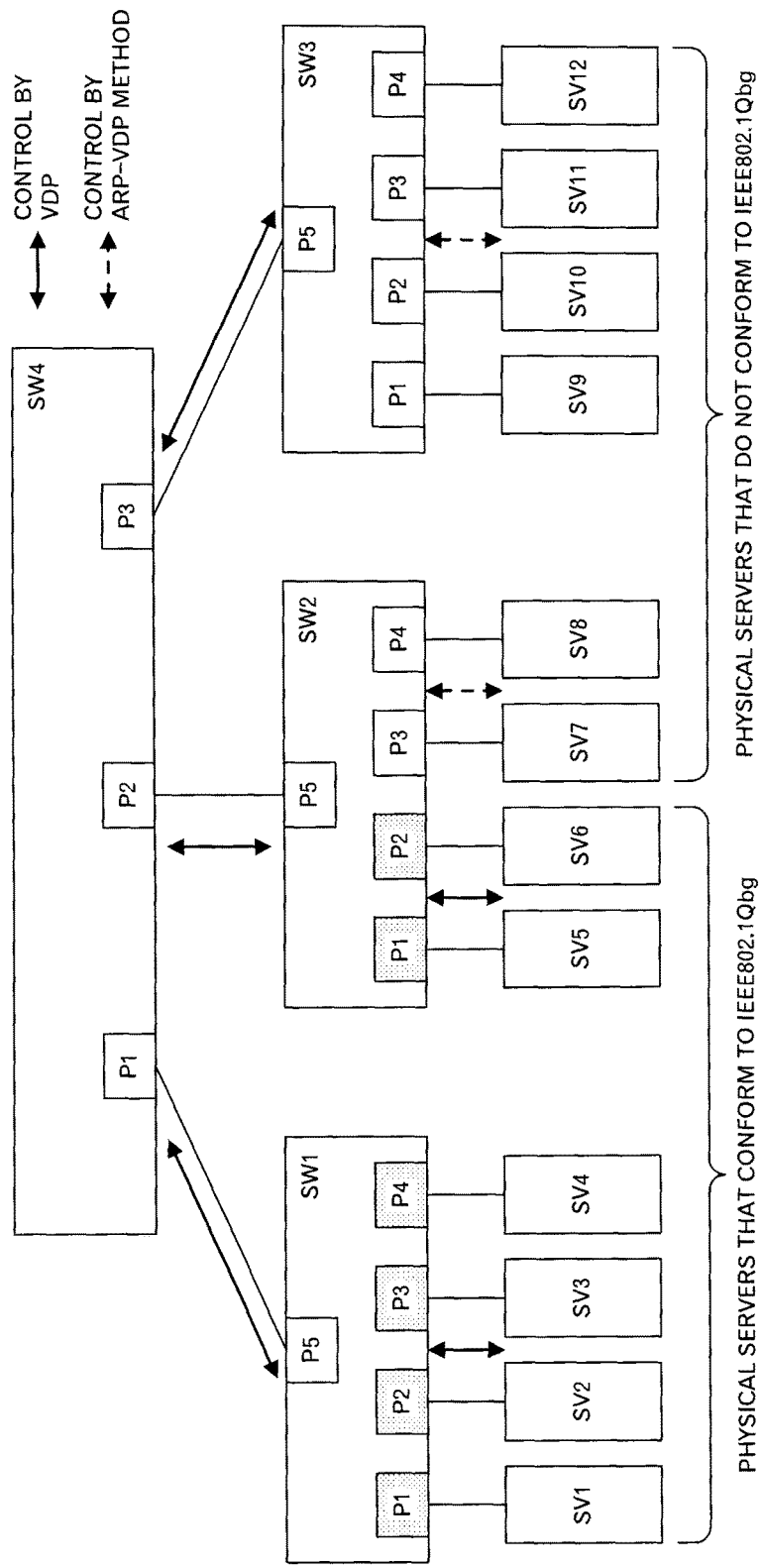
FIG. 21 is a diagram depicting a system in which the physical server conforming to the standard and the physical server not conforming to the standard coexist.

FIG. 21 illustrates a system in which physical servers that conform to and physical servers that do not conform to the IEEE 802.1Qbg standard coexist. The system illustrated in FIG. 21 has physical switches (abbreviated as SW in FIG. 21) SW1 to SW4, and physical servers (abbreviated as SV in FIG. 21) SV1 to SV12. SW1 to SW3 are physical switches that can execute the ARP-VDP method, and SW4 is a physical switch that cannot execute the ARP-VDP method, however conforms to the IEEE 802.1Qbg standard. The hypervisors in SV1 to SV6 conform to the IEEE 802.1Qbg standard, however the hypervisors of SV7 to SV12 do not conform to the IEEE 802.1Qbg standard. The solid line arrow represents control by VDP, and the dotted line arrow represents control by the ARP-VDP method.

SW1 to SW4 are connected with the multi-stage connection. Port P5 of SW1 is connected to port P1 of SW4, port P5 of SW2 is connected to port P2 of SW4, and port P5 of SW3 is connected to port P3 of SW4. SV1 is connected to port P1 of SW1, SV2 is connected to port P2 of SW1, SV3 is connected to port P3 of SW1, and SV4 is connected to port P4 of SW1. SV5 is connected to port P1 of SW2, SV6 is connected to port P2 of SW2, SV7 is connected to port P3 of SW2, and SV8 is connected to port P4 of SW2. SV9 is connected to port P1 of SW3, SV10 is connected to port P2 of SW3, SV11 is connected to port P3 of SW3, and SV12 is connected to port P4 of SW3. Ports to which the physical servers that conform to the IEEE 802.1Qbg standard are connected are shaded.

In a case such as this, control between SV1 to SV6 that conform to the IEEE 802.1Qbg standard and the ports P1 to P4 of SW1 and the ports P1 and P2 of SW2 is performed according to VDP. On the other hand, control between SV7 to SV12 that do not conform to the IEEE 802.1Qbg standard, and the ports P3 and P4 of SW2 and ports P1 to P4 of SW3 is performed according to the ARP-VDP method. Moreover, control between SW1 to SW3 and SW4 is performed according to VDP.

Even in such a case where the physical servers that conform to the standard and physical servers that do not conform to the standard coexist, it is possible to automatically set physical switches that are connected in the multi-stage connection when the physical switches that are connected to the physical servers support the ARP-VDP method.

Embodiment 2

In a second embodiment, the case in which physical switches are not connected with the multi-stage connection will be explained.

Figure 22:
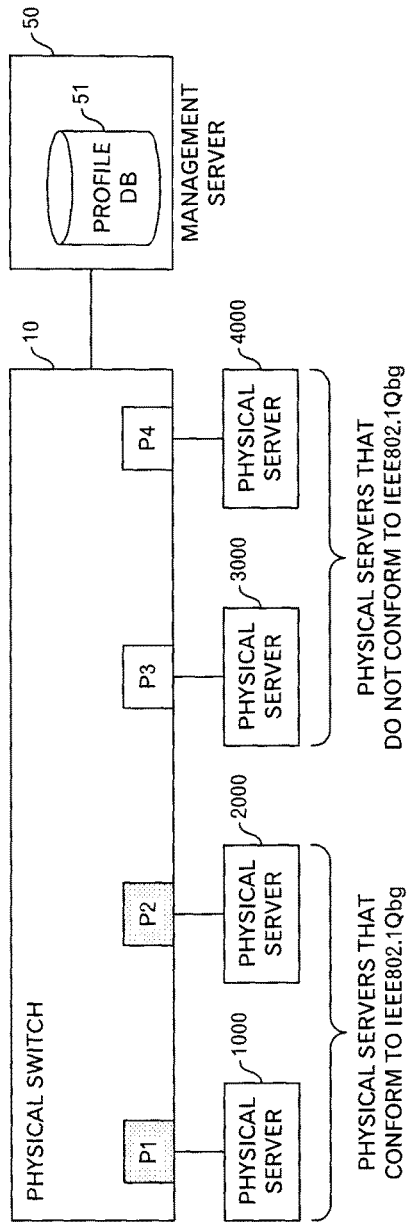
FIG. 22 is a diagram depicting an outline of a system in a second embodiment.
Figure 23:
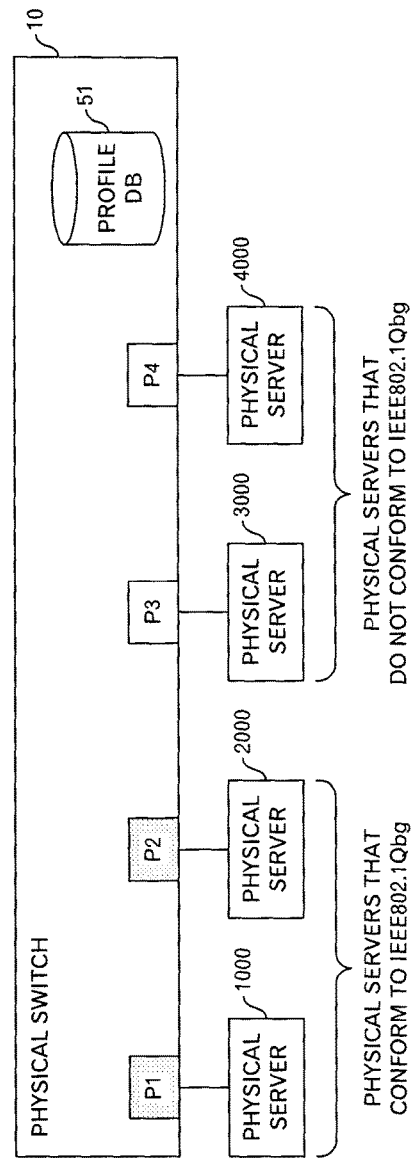
FIG. 23 is a diagram depicting the outline of the system in the second embodiment.

FIG. 22 illustrates a system in the second embodiment. In the second embodiment, there is one physical switch, and four physical servers that are connected to that physical switch. Physical server 1000 is connected to port 1 (P1 in FIG. 22) of physical switch 10, physical server 2000 is connected to port 2 (P2 in FIG. 22) of the physical switch 10, physical server 3000 is connected to port 3 (P3 in FIG. 22) of the physical switch 10, and physical server 4000 is connected to port 4 (P4 in FIG. 22) of the physical switch 10. A management server 50 that manages a profile DB 51 is also connected to the physical switch 10. As illustrated in FIG. 23, the management server 50 may not be provided, and the physical switch 10 may manage the profile DB 51.

The physical switch 10 conforms to the IEEE 802.1Qbg standard, and executes the ARP-VDP method. The hypervisors in the physical server 1000 and physical server 2000 conform to the IEEE 802.1Qbg standard. The hypervisors in the physical server 3000 and physical server 4000 do not conform to the IEEE 802.1Qbg standard. In FIG. 22 and FIG. 23, ports that are connected to the physical servers that conform to the IEEE 802.1Qbg standard are shaded.

The functional blocks of the physical switch 10 in the second embodiment are the same as the functional blocks of the physical switches in the first embodiment.

Figures 24, 25:
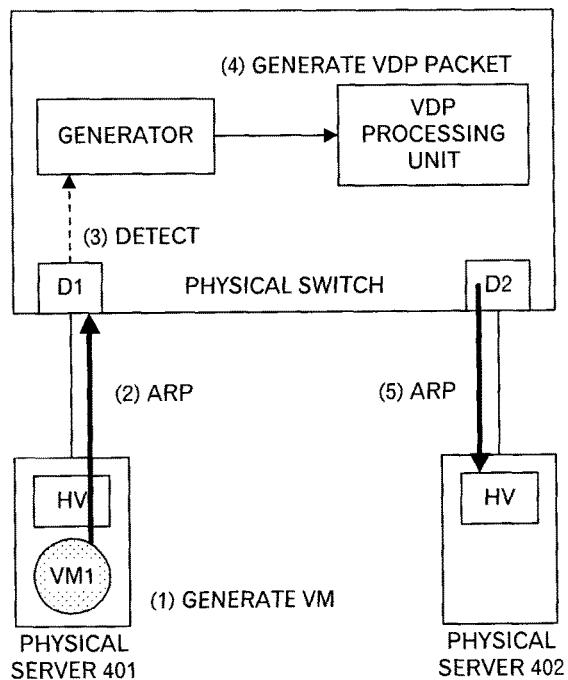
FIG. 24 is a diagram to explain generation conditions in the second embodiment.
FIG. 25 is a diagram to explain the relay of the VDP packet and ARP packet in the second embodiment.

FIG. 24 illustrates the generation conditions for a VDP packet in the second embodiment. The configuration illustrated in FIG. 24 is the same as that illustrated in FIG. 11, however, in FIG. 24 there is no column of "Transmission to uplink". This is because, in the second embodiment, the physical switch is not connected with the multi-stage connection, so VDP packets are not transmitted to the uplink.

Figure 26:
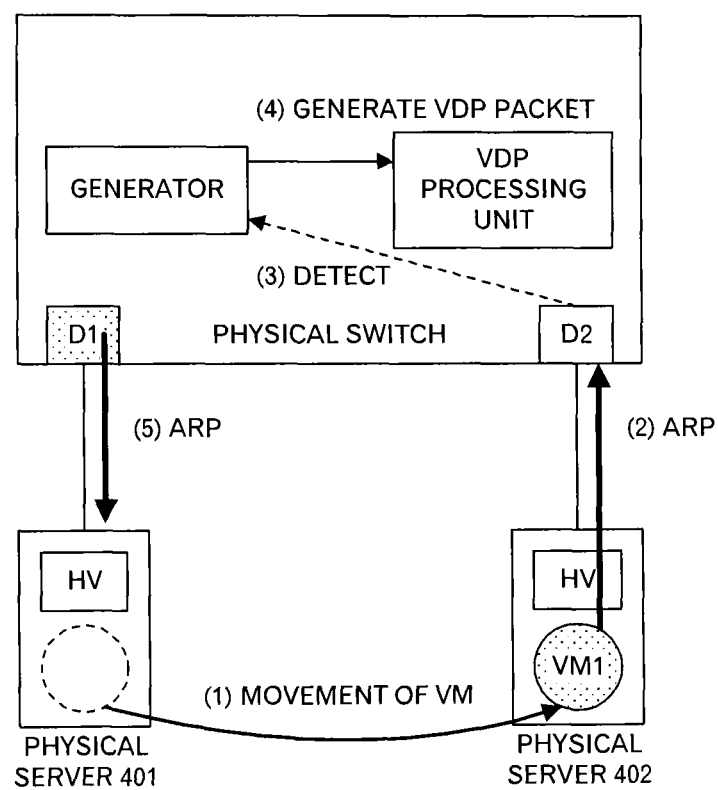
FIG. 26 is a diagram to explain the relay of the VDP packet and ARP packet in the second embodiment.

Next, the relay of VDP packets and ARP packets in the second embodiment will be explained in detail by using FIGS. 25 and 26. FIG. 25 illustrates an example of the case in which generation of a VM is performed. FIG. 26 illustrates an example in which movement of a VM is performed among the physical servers that are connected to the same physical switch.

The system that is illustrated in FIG. 25 and FIG. 26 has a physical switch, a physical server 401 and physical server 402. The physical server 401 is connected to port D1 of the physical switch. The physical server 402 is connected to port D2 of the physical switch. The physical switch is a switch that can execute the ARP-VDP method. The hypervisors of the physical server 401 and physical server 402 do not conform to the IEEE 802.1Qbg standard. HV is the abbreviation for hypervisor. The thick solid lines represent a relay of an ARP packet, and the thin solid lines represent a relay of a VDP packet. The dotted line represents the detection of an ARP packet.

In FIG. 25, at the stage where learning the MAC address of VM1 has not been performed, a new VM1 is generated on the physical server 401 ((1) in FIG. 25). The generated VM1 transmits an ARP packet to the physical switch ((2) in FIG. 25). The physical switch detects the ARP packet from VM1 at the port D1 ((3) in FIG. 25). The generator regards this as being that an ASSOC type of VDP packet was received from the port D1, which is a temporary receiving port, and generates a VDP packet ((4) in FIG. 25). The VDP processing unit receives the VDP packet and executes the VDP processing. Then, the physical switch broadcasts the ARP packet to the physical server 402 that belongs to the same domain ((5) in FIG. 25). As a result, it is possible to adequately set the relay of packets for VM1 at the physical switch.

In FIG. 26, learning the MAC address of VM1 is performed for the port D1 of the physical switch. At this stage, VM1 moves from the physical server 401 to the physical server 402 ((1) in FIG. 26). After moving, VM1 transmits an ARP packet to the physical switch ((2) in FIG. 26). The physical switch detects the ARP packet from VM1 at the port D2 ((3) in FIG. 26). The generator regards this as being that an ASSOC type of VDP packet was received from the port D2, which is a temporary receiving port, and that a DE-ASSOC type of VDP packet was received from the port D1, which is a temporary receiving port, and generates a VDP packet ((4) in FIG. 26). The VDP processing unit receives the VDP packet and executes the VDP processing. Then, the physical switch broadcasts an ARP packet to the physical server 401 that belongs to the same domain ((5) in FIG. 26).

In this way, with the ARP-VDP method, even when physical switches are not connected with the multi-stage connection, setting of the physical switch can be performed automatically.

Although the embodiments of this invention were explained, this invention is not limited to these. For example, functional block configurations of the aforementioned physical switches 10 and 20, physical server 1000 and 2000 and management server 50 do not always correspond to program module configurations.

Furthermore, the data structures explained above are mere examples, and may be changed. Moreover, as for the processing flow, as long as the processing results are not changed, turns of the steps may be exchanged, and plural steps may be executed.

Furthermore, in the first embodiment, the profile DB 51 is managed in the management server 50. However, as illustrated in FIG. 23, the physical switch may manage the profile DB 51.

Furthermore, as for the multi-stage connection, any form other than that illustrated in FIG. 2 may be employed.

Figure 27:
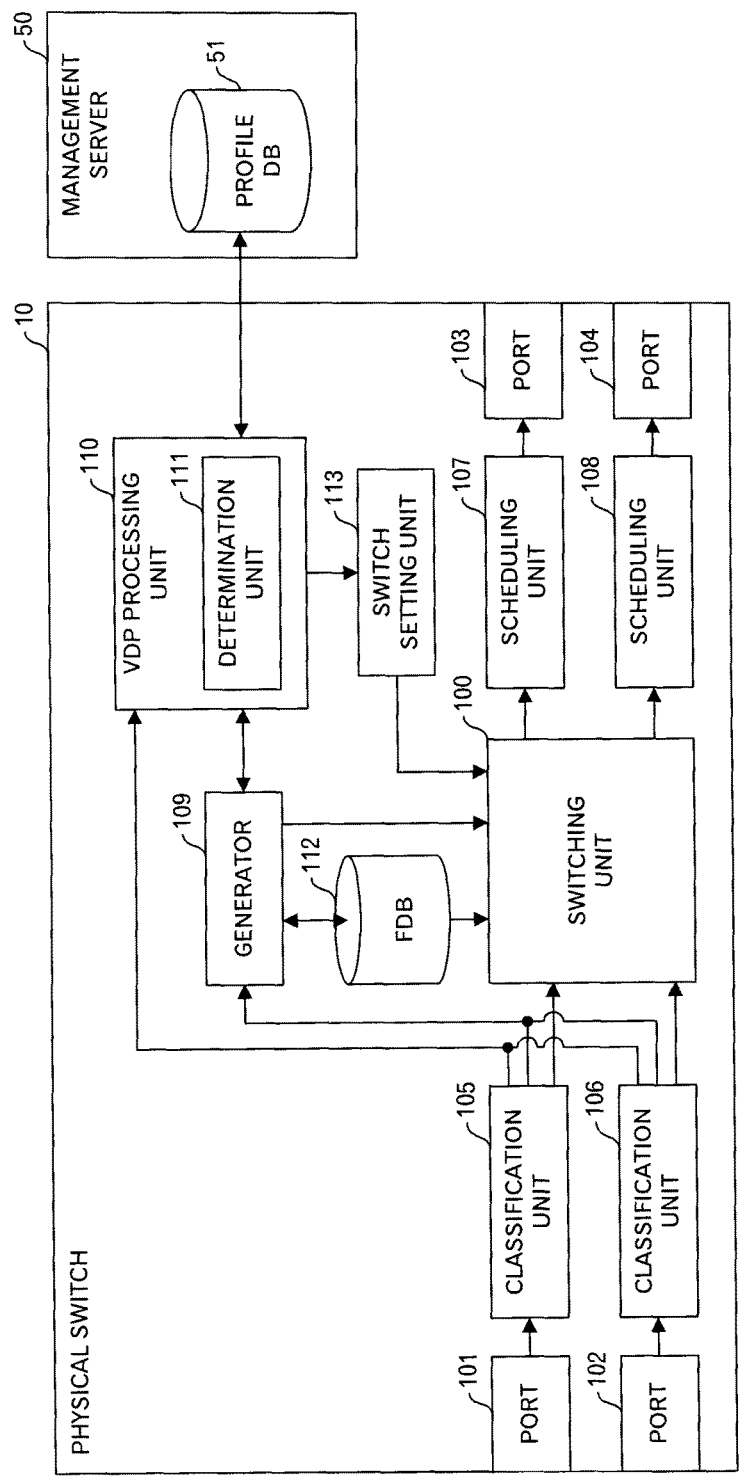
FIG. 27 is a functional block diagram of a physical switch and management server.

Moreover, the functional block diagrams of the physical switches 10 and 20 may be that in FIG. 27. In FIG. 27, the classification units 105 and 106 identify the VDP packet and packet such as ARP, and when the packet is the VDP packet, the classification units 105 and 106 output the VDP packet to the VDP processing unit 110, and when the packet is a packet such as ARP, the classification units 105 and 106 output the ARP packet or the like to the generator 109. Accordingly, the generator 109 does not perform a processing to receive the VDP packet from the classification units 105 and 106 and transfer it to the VDP processing unit 110. The distinction between the port connected to the physical server conforming to the standard and the port connected to the physical server not conforming to the standard is performed by managing flags set by the user.

The aforementioned embodiments of this invention are outlined as follows:

A relay apparatus, relating to a first aspect of the embodiments, includes: (A) a generator that generates, upon receipt of a first packet that includes an identifier of a virtual machine that is newly executed in an information processing apparatus connected to the relay apparatus from the information processing apparatus, a second packet that includes the identifier of the virtual machine and requests to set relay for the virtual machine; and (B) a transmission unit that transmits the generated second packet to another relay apparatus connected to the relay apparatus.

Accordingly, even when the hypervisor in the information processing apparatus does not support VDP, the second packet is generated in the relay apparatus connected to the information processing apparatus. Therefore, the setting of the relay apparatuses that are connected with the multi-stage connection can be automatically performed. Moreover, when the aforementioned generator is provided in the relay apparatus, little modification is made for the relay apparatus. Therefore, the conventional technique can be effectively utilized.

Moreover, the relay apparatus may further include (C) a determination unit that determines whether or not the virtual machine is a virtual machine that is newly executed in response to movement between information processing apparatuses connected to the relay apparatus. Then, (b1) when it is determined that the determination unit that the virtual machine is not a virtual machine that is newly executed in response to the movement between the information processing apparatuses connected to the relay apparatus, the aforementioned transmission unit may transmit the second packet to another relay apparatus connected to the relay apparatus. When a virtual machine is newly executed in response to the movement between the information processing apparatuses connected to the relay apparatus, there is no need to change setting in another relay apparatus connected to the relay apparatus. Therefore, by doing so, the second packet is not uselessly sent.

Moreover, the relay apparatus may further include (D) a first data storage unit that stores a port identifier in association with the identifier of the virtual machine. Then, the aforementioned generator (a1) may generate information that represents a type of setting based on a relationship between (a) the port identifier stored in the first data storage unit in association with the identifier of the virtual machine and (b) a port identifier of a port that received the first packet, and generate the second packet including the generated information that represents the type of setting. Accordingly, it becomes possible to appropriately perform setting in another relay apparatus.

In addition, the aforementioned transmission unit (b2) may transmit the first packet to another relay apparatus connected to the relay apparatus after transmitting the second packet. Thus, because another relay apparatus processes the first packet after the setting caused by the second packet is made, the first packet is not discarded, and the first packet is processed along with its original purpose.

Moreover, the relay apparatus may further include (E) an obtaining unit that obtains setting information corresponding to the identifier of the virtual machine, which is included in the generated second packet, from a second data storage unit that stores setting information of the virtual machine for each identifier of the virtual machine, and (F) a setting unit that performs setting of relay for the virtual machine based on the obtained setting information. Accordingly, it becomes possible for the relay apparatus to appropriately perform the relay of the packet for the virtual machine.

Moreover, the aforementioned first packet may be a packet in a predetermined protocol. When all of packets transmitted from the information processing apparatus are processed, increase of loads in the relay apparatus may badly affect the relay processing. Then, by limiting the processing target to packets in the predetermined protocol, it is possible to suppress the increase of the loads in the relay apparatus.

In addition, upon receipt of a third packet including an identifier of a second virtual machine that is newly executed from another relay apparatus connected to the relay apparatus, the aforementioned generator may (a2) generate a fourth packet that requests to set the relay for the second virtual machine and includes the identifier of the second virtual machine, and the aforementioned transmission unit may (b3) transmit the generated fourth packet to another relay apparatus connected to the relay apparatus. Thus, it is possible to cope with a case where a virtual machine is newly executed in the information processing apparatus connected to the relay apparatus under another relay apparatus.

Moreover, the aforementioned second packet may be a VDP packet. Thus, it becomes possible to cope with a case where the information processing apparatus does not support the VDP.

Moreover, the aforementioned identifier of the virtual machine may be a MAC address. By utilizing the MAC address, it is possible to uniquely identify the virtual machine.

In addition, the aforementioned predetermined protocol may be an address resolution protocol. The increase of the loads in the relay apparatus by processing packets in the ARP does not affect the relay processing seriously.

A control method of a relay apparatus, which relates to a second aspect of the embodiments includes: (G) generating, upon receipt of a first packet that includes an identifier of a virtual machine that is newly executed in an information processing apparatus connected to the relay apparatus from the information processing apparatus, a second packet that includes the identifier of the virtual machine and requests to set relay for the virtual machine; and (B) transmitting the generated second packet to another relay apparatus connected to the relay apparatus.

A relay apparatus relating to a third aspect of the embodiments includes: (I) a generator that generates, upon receipt of a first packet that includes a first identifier of a virtual machine that is newly executed in an information processing apparatus connected to the relay apparatus from the information processing apparatus, a second packet that includes a second identifier of the virtual machine, which is different from the first identifier, and requests to set relay for the virtual machine; and (J) a processing unit that sets the relay for the virtual machine by using the second identifier of the virtual machine, which is included in the second packet generated by the generator or received from the information processing apparatus.

Thus, regardless of whether or not the hypervisor in the information processing apparatus support the VDP, it is possible to automatically perform the setting of the relay apparatus.

A control method of a relay apparatus, which relates to a fourth aspect of the embodiments, includes: (K) generating, upon receipt of a first packet that includes a first identifier of a virtual machine that is newly executed in an information processing apparatus connected to the relay apparatus from the information processing apparatus, a second packet that includes a second identifier of the virtual machine, which is different from the first identifier, and requests to set relay for the virtual machine; and (L) setting the relay for the virtual machine by using the second identifier of the virtual machine, which is included in the second packet generated in the generating or received from the information processing apparatus.

Incidentally, it is possible to create a program causing a processor to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A relay apparatus for relaying packets, comprising:
a first memory that stores an identifier of a virtual machine in association with an identifier of a port for which setting of relay for the virtual machine has been performed; and
circuitry configured to:
receive, from an information processing apparatus, a first packet that includes a first identifier of a first virtual machine that is newly executed in the information processing apparatus;
specify, based on a relationship between a first port that received the first packet and a second port whose identifier is associated with the first identifier in the first memory, a type of a second packet from a first type to apply setting of relay for the first virtual machine to the first port, a second type to delete the setting of the relay for the first virtual machine from the second port, and a third type to apply the setting of the relay for the first virtual machine to the first port and delete the setting of the relay for the first virtual machine from the second port;
generate the second packet that includes a second identifier of the first virtual machine and information that represents the specified type, wherein the second identifier of the first virtual machine includes a Virtual Station Interface ID (VSIID); and
change setting of at least one of the first port and the second port based on the second packet generated by the circuitry.

2. The relay apparatus as set forth in claim 1, wherein the circuitry is configured to transmit the second packet to another relay apparatus connected to the relay apparatus.

3. The relay apparatus as set forth in claim 2, wherein
the circuitry is configured to determine whether or not the first virtual machine is a virtual machine that is newly executed in response to movement between information processing apparatuses connected to the relay apparatus, and
upon determining that the first virtual machine is not the virtual machine that is newly executed in response to the movement between the information processing apparatuses connected to the relay apparatus, the circuitry is configured to transmit the second packet to the another relay apparatus connected to the relay apparatus.

4. The relay apparatus as set forth in claim 2, wherein the circuitry is configured to transmit the first packet to the another relay apparatus connected to the relay apparatus, after transmitting the second packet.

5. The relay apparatus as set forth in claim 2, wherein, upon receipt of a third packet that includes a third identifier of a second virtual machine that is newly executed from the another relay apparatus connected to the relay apparatus, the circuitry is configured to generate a fourth packet that includes a fourth identifier of the second virtual machine and information that represents a type of the fourth packet.

6. The relay apparatus as set forth in claim 1, wherein the circuitry is configured to obtain setting information that corresponds to the second identifier included in the second packet from a second memory that stores setting information of a virtual machine in association with an identifier of the virtual machine.

7. The relay apparatus as set forth in claim 1, wherein the first packet is a packet in a predetermined protocol.

8. The relay apparatus as set forth in claim 7, wherein the predetermined protocol is an Address Resolution Protocol.

9. The relay apparatus as set forth in claim 1, wherein the second packet is a Virtual station interface Discovery and configuration Protocol packet.

10. The relay apparatus as set forth in claim 1, wherein the first identifier of the first virtual machine is a MAC address.

11. The relay apparatus as set forth in claim 1, wherein the second identifier of the first virtual machine includes the Virtual Station Interface ID (VSIID) and a format of the VSIID.

12. A computer-readable, non-transitory storage medium storing a program for causing a relay apparatus to execute a process, the process comprising:
  receiving, from an information processing apparatus, a first packet that includes a first identifier of a first virtual machine that is newly executed in the information processing apparatus;
  specifying, based on a relationship between a first port that received the first packet and a second port whose identifier is associated with the first identifier in a memory of the relay apparatus, a type of a second packet from a first type to apply setting of relay for the first virtual machine to the first port, a second type to delete the setting of the relay for the first virtual machine from the second port, and a third type to apply the setting of the relay for the first virtual machine to the first port and delete the setting of the relay for the first virtual machine from the second port, wherein the memory stores an identifier of a virtual machine in association with an identifier of a port for which setting of relay for the virtual machine has been performed;
  generating the second packet that includes a second identifier of the first virtual machine and information that represents the specified type, wherein the second identifier of the first virtual machine includes a Virtual Station Interface ID (VSIID); and
  changing setting of at least one of the first port and the second port based on the second packet generated in the generating.

13. A control method, comprising:
  receiving, by using a relay apparatus and from an information processing apparatus, a first packet that includes a first identifier of a first virtual machine that is newly executed in the information processing apparatus;
  specifying, by using the relay apparatus and based on a relationship between a first port that received the first packet and a second port whose identifier is associated with the first identifier in a memory of the relay apparatus, a type of a second packet from a first type to apply setting of relay for the first virtual machine to the first port, a second type to delete the setting of the relay for the first virtual machine from the second port, and a third type to apply the setting of the relay for the first virtual machine to the first port and delete the setting of the relay for the first virtual machine from the second port, wherein the memory stores an identifier of a virtual machine in association with an identifier of a port for which setting of relay for the virtual machine has been performed;
  generating, by using the relay apparatus, the second packet that includes a second identifier of the first virtual machine and information that represents the specified type, wherein the second identifier of the first virtual machine includes a Virtual Station Interface ID (VSIID); and
  changing, by using the relay apparatus, setting of at least one of the first port and the second port based on the second packet generated in the generating.

* * * * *